(12) United States Patent
Suito et al.

(10) Patent No.: US 6,459,735 B1
(45) Date of Patent: Oct. 1, 2002

(54) INFORMATION PROCESSING APPARATUS, INFORMATION PROCESSING METHOD, AND DISTRIBUTION MEDIA

(75) Inventors: Taro Suito, Kanagawa; Masashi Ohta; Katsunari Miyata, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/447,496

(22) Filed: Nov. 23, 1999

(30) Foreign Application Priority Data

Nov. 30, 1998 (JP) .......................................... 10-339272

(51) Int. Cl.[7] ............................................... H04N 7/12
(52) U.S. Cl. ................................................ 375/240.15
(58) Field of Search .................. 375/240.01, 240.02, 375/240.03, 240.1, 240.11, 240.13, 240.18, 240.15; 386/46; 348/460, 907, 699; 358/908; H04B 7/66; H04N 5/16

(56) References Cited

U.S. PATENT DOCUMENTS

| | | | |
|---|---|---|---|
| 5,151,788 A | 9/1992 | Blum | 358/188 |
| 5,333,091 A | 7/1994 | Iggulden et al. | 360/14.1 |
| 5,455,630 A | 10/1995 | McFarland et al. | 348/476 |
| 5,504,518 A * | 4/1996 | Ellis et al. | 348/2 |
| 5,692,093 A | 11/1997 | Iggulden et al. | 386/46 |
| 5,696,866 A | 12/1997 | Iggulden et al. | 386/46 |
| 5,987,210 A * | 11/1999 | Iggulden et al. | 386/46 |
| 6,088,007 A * | 7/2000 | Shioya | 345/10 |
| 6,285,818 B1 * | 9/2001 | Suito et al. | 386/46 |

* cited by examiner

Primary Examiner—Chris Kelley
Assistant Examiner—Tung T. Vo
(74) Attorney, Agent, or Firm—Oblon, Spivak, McClelland, Maier & Neustadt, P.C.

(57) ABSTRACT

A commercial candidate section detector detects a commercial candidate section on the basis of a quiet section and a scene change point. A commercial characteristic quantity detector judges whether the commercial candidate section has various characteristics of commercials, and adds a predetermined value to an commercial characteristic value on the basis of the judgment result. The commercial characteristic quantity detector compares the final commercial characteristic value with a predetermined threshold value, and judges on the basis of the comparison result whether the commercial candidate section is a commercial section.

58 Claims, 29 Drawing Sheets

DELAY PICTURE $$Y_A = \frac{\sum_{i=1}^{n} \sum_{i=1}^{m} D_{ij}}{n \times m}$$

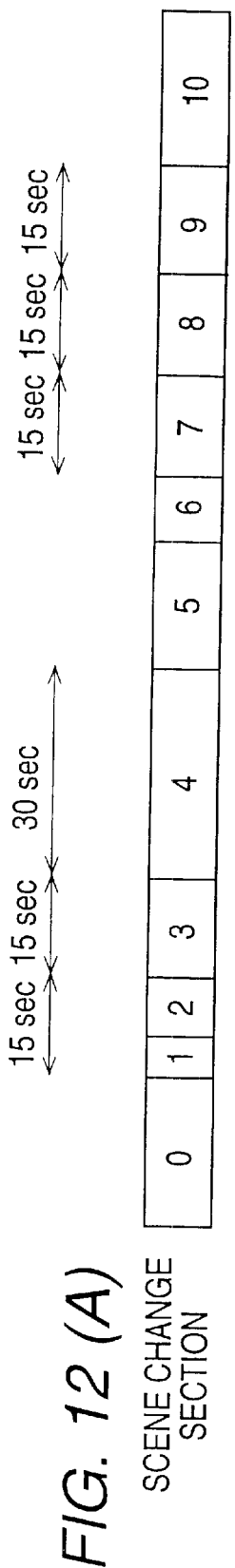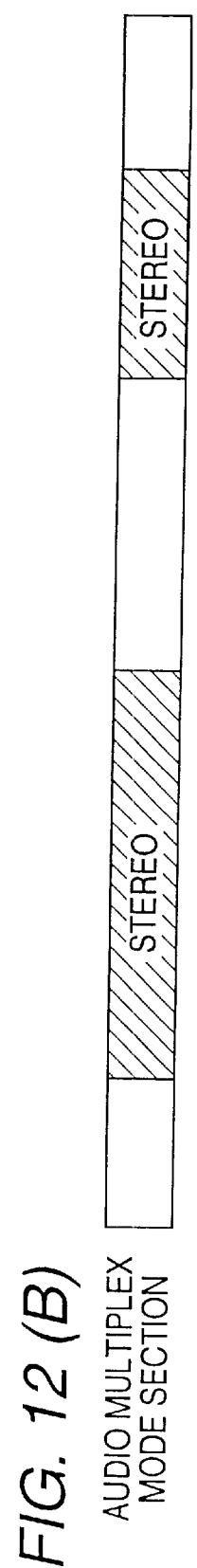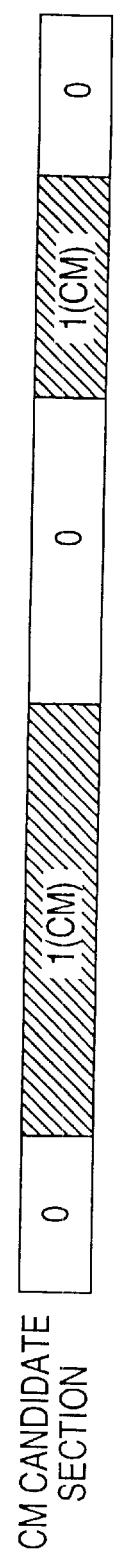
FIG. 12 (A) SCENE CHANGE SECTION
FIG. 12 (B) AUDIO MULTIPLEX MODE SECTION
FIG. 12 (C) CM CANDIDATE SECTION

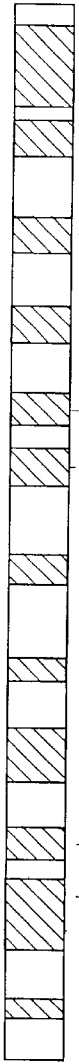
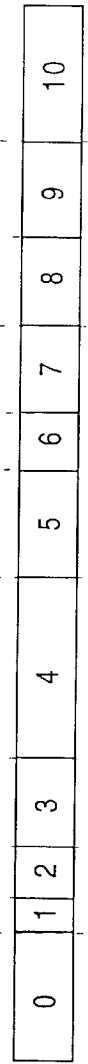
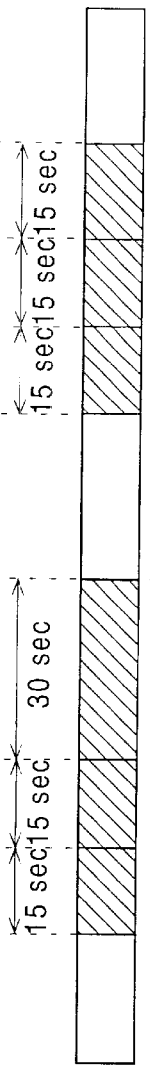
FIG. 14 (A) SOUNDLESS
FIG. 14 (B) SCENE CHANGE
FIG. 14 (C) (A) AND (C)
FIG. 14 (D) GROUPING
FIG. 14 (E) AUDIO MODE
FIG. 14 (F) CM CANDIDATE SECTION
FIG. 14 (G) CM JUDGEMENT RESULT

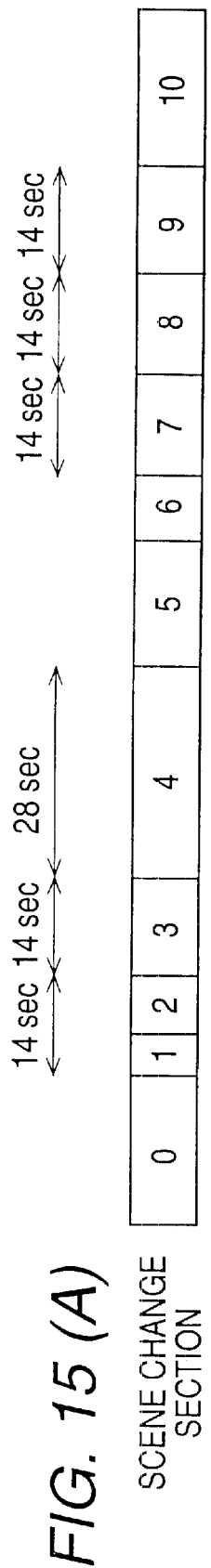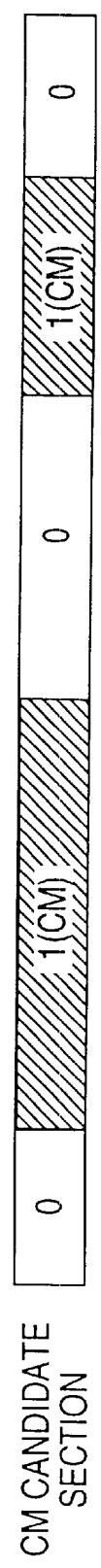
FIG. 15 (A) SCENE CHANGE SECTION
FIG. 15 (B) AUDIO MULTIPLEX MODE SECTION
FIG. 15 (C) CM CANDIDATE SECTION

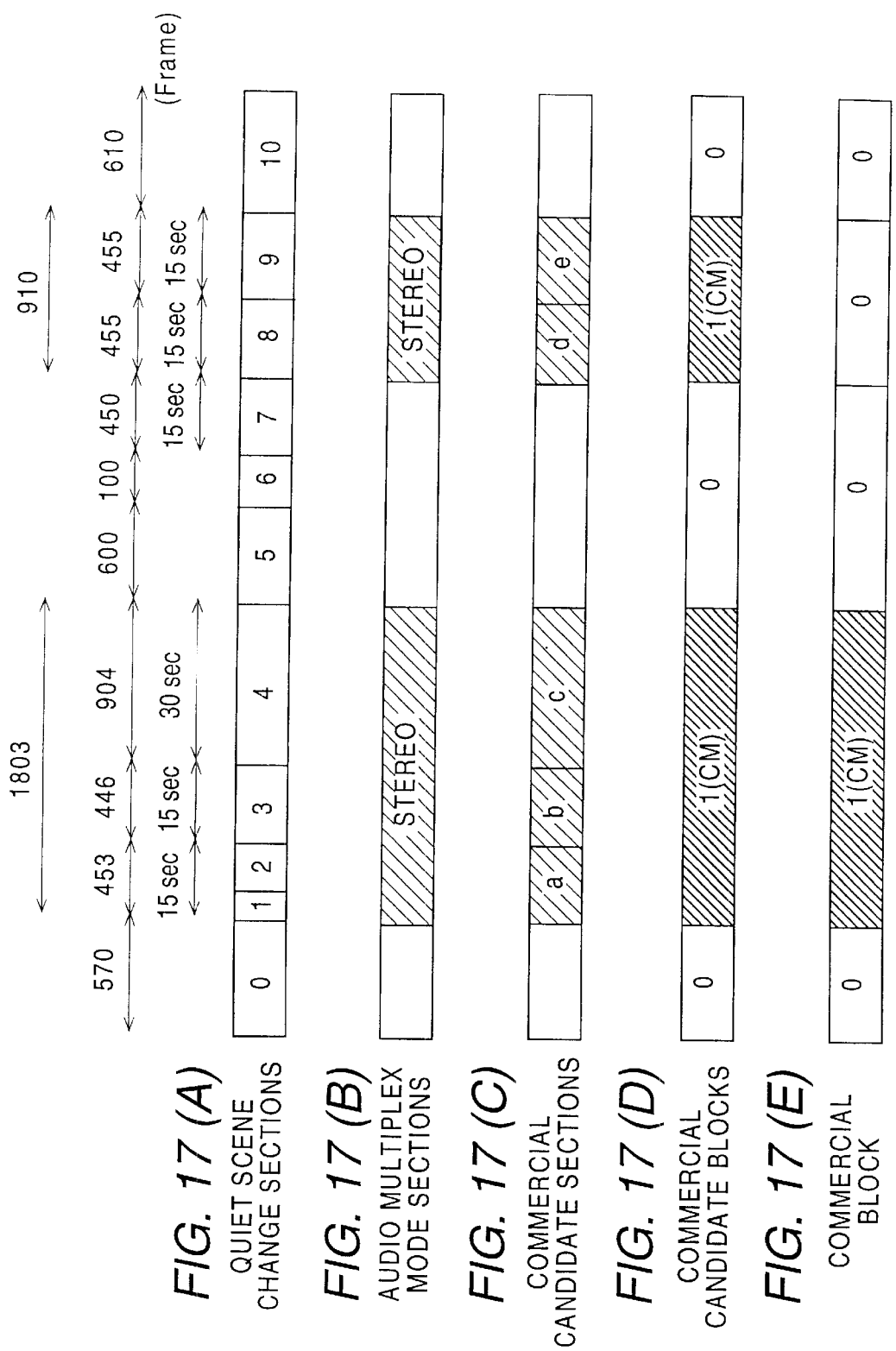

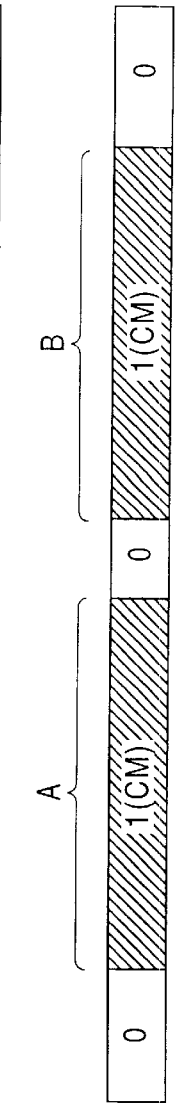
FIG. 18 (A) QUIET SCENE CHANGE SECTIONS
FIG. 18 (B) AUDIO MULTIPLEX MODE SECTIONS
FIG. 18 (C) COMMERCIAL CANDIDATE SECTIONS
FIG. 18 (D) COMMERCIAL CANDIDATE BLOCKS
FIG. 18 (E) COMMERCIAL BLOCK

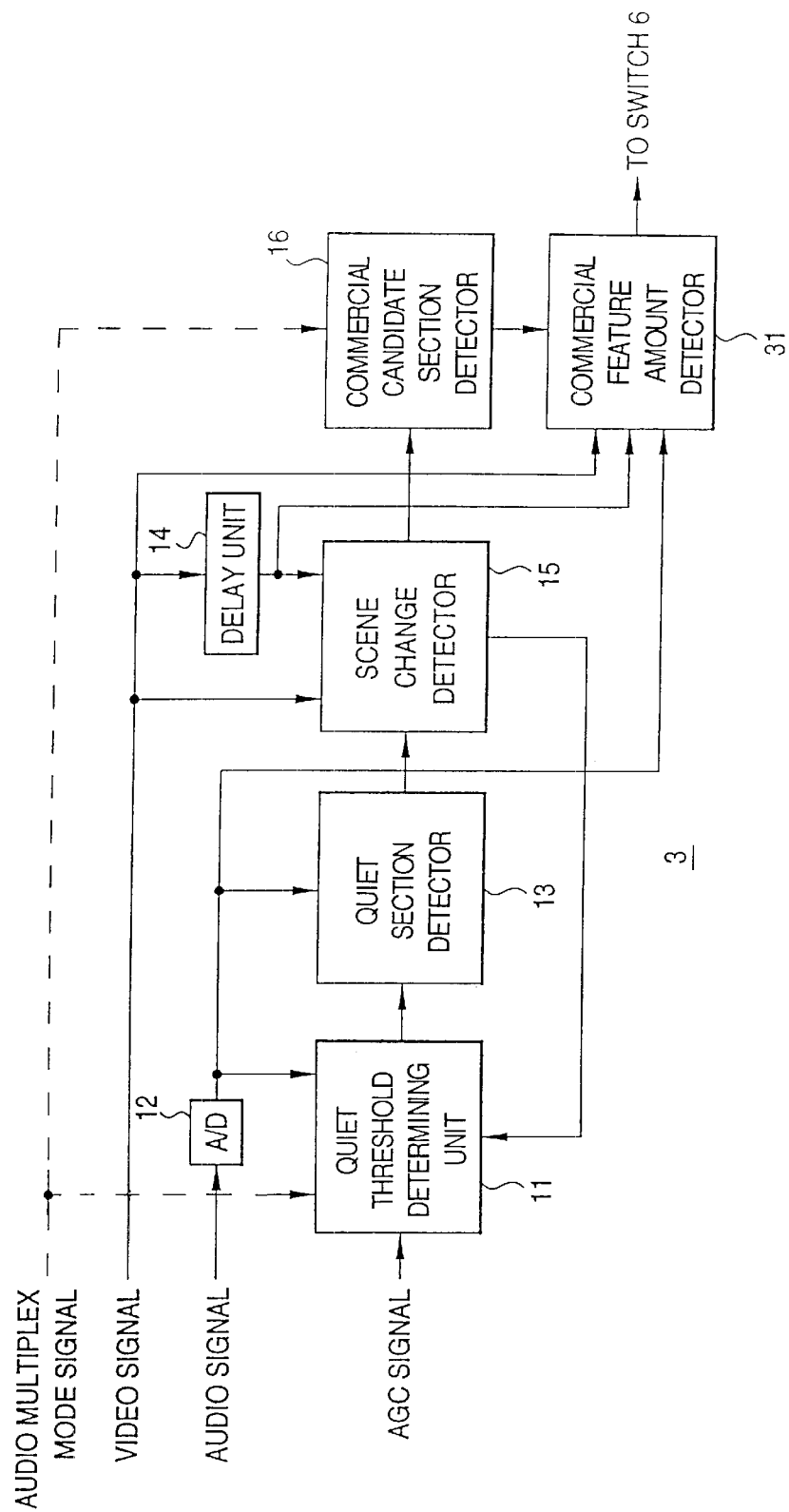

INFORMATION PROCESSING APPARATUS, INFORMATION PROCESSING METHOD, AND DISTRIBUTION MEDIA

CROSS-REFERENCES TO RELATED APPLICATIONS

This application is related to U.S. patent application Ser. Nos. 09/448,836 and 09/448,037, both of which are filed on the same date as this application. These applications correspond with Attorney Docket Nos. SONY-Q9137 and SONY-Q9138. Both applications are titled INFORMATION PROCESSING APPARATUS, INFORMATION PROCESSING METHOD, AND DISTRIBUTION MEDIA, both have the same co-inventors as in this application and both are assigned to the assignee of the present invention. Both of said applications are incorporated herein by reference.

BACKGROUND OF THE INVENTION

1. Field of the Invention

The present invention relates to an information processing device and method, and an information supply medium, and particularly to an information processing device and method and an information supply medium for detecting commercials contained in a television broadcast.

2. Description of the Related Art

When a recorded television broadcast is reproduced, in order to satisfy users' needs for continuously watching only a program, there has been provided a video recorder (e.g., a video cassette recorder or "VCR") having a so-called commercial cut function which fast feeds a commercial advertisement (hereinafter referred to as a "commercial" or a "CM").

A commercial detection algorithm used in such a video recorder is based on the following characteristics which are unique to commercials or characteristic of a number of commercials. That is, if the following characteristics are confirmed, the portion thus confirmed is detected as a commercial: a quiet section of 0.1 to 2.0 seconds exists at the start and end times of each commercial; a scene change point of an image exists at each quiet section; the duration of each commercial is equal to an integral multiple of 15 seconds; and (for commercials broadcast outside of the United States, e.g., in Japan) the sound multiplex mode changes from a monaural mode for programs to a stereo mode for commercials.

In television broadcast systems of America and Europe, commercials may be detected on the basis of a black frame or blue frame existing between a program and a commercial.

Therefore, according to a conventional commercial detection algorithm, any commercial in which at least one of the above characteristics is not present, such as a Japanese commercial having a monaural sound multiplex mode, cannot be detected.

Further, according to the conventional commercial detection algorithm, if the above characteristics are contained in a part of a program, that portion of the program is erroneously detected as a commercial.

If the characteristics of commercials which have been used in the conventional algorithm were altered or abolished (for example, if the duration of commercials were changed to an integral multiple of 14 seconds or if inserting of the black frame or blue frame were abolished in America or Europe), no commercial would be detected.

Furthermore, according to the detection method of the quiet section in the conventional commercial detection algorithm, the average level of sound over a section is calculated, and if the average level thus calculated is below a predetermined threshold value, the section concerned is detected as a quiet section. Therefore, the detection precision for the quiet section is different between a case of bad reception of a television broadcast (e.g., if the signal to noise ratio ("S/N") of sound signals is low due to a weak electric field) and a case where the electric field is not weak, so that no commercial can be reliably detected.

The measurement of the time required for a commercial in the conventional commercial detection algorithm is performed by counting the number of frames, while the number of frames per second is set to about 30 frames. However, since an error of several frames often occurs in the actual broadcast, a margin of error is provided to the threshold value to identify the needed time in connection with the error. Accordingly, erroneous detection or non-detection of commercials occurs due to the margin of error.

Further, when a commercial spot of a TV station is broadcast between a commercial and a program for a short time, e.g., for 5 seconds, the spot is something like a commercial from the perspective of viewers. However, the spot is not detected because it does not have the foregoing characteristics of commercials.

SUMMARY OF THE INVENTION

It is an object of the invention to provide a method, apparatus and computer program for correctly detecting commercials contained in television broadcasts.

It is a further object of the present invention to reduce or eliminate the need to view commercials when reproducing previously recorded television broadcasts.

It is a feature of the present invention to stop recording of a television broadcast when a commercial is detected.

It is an additional feature of the present invention to instead index commercials when recording a television broadcast in order to permit the high speed fast forwarding through such commercials, yet preserve the ability to view such commercials according to the wishes of a viewer.

It is an advantage of the present invention to reduce the amount of time a viewer must spend in viewing a desired television program.

It is a further advantage of the present invention to reduce the amount of recording media storage space necessary to record a desired television program, by not recording commercials interspersed with the desired television program.

It is yet another advantage of the present invention to allow a viewer to index commercials to permit the viewing of such commercials when desired by the viewer.

According to one aspect of the invention, there is provided an apparatus for processing a television signal which includes: means for receiving a television signal; means for detecting a commercial candidate section in the television signal; means for determining characteristics of the commercial candidate section; and means for judging whether or not the commercial candidate section is a commercial, based on the characteristics detected by the determining means.

According to another aspect of the invention, there is provided an apparatus for processing a television signal which includes: means for receiving a television signal; means for detecting a commercial candidate section in the television signal; means for determining a frequency of scene changes in the commercial candidate section and for increasing a commercial characteristic value if the frequency of scene changes is above a predetermined level; means for determining whether or not the audio signal in the commercial candidate section has a periodicity, for calculating a level of periodicity detected and for increasing a commercial characteristic value if the calculated periodicity is above a predetermined level; means for determining a level of continuity of the periodicity of the audio signal in the commercial candidate section and for increasing a commercial characteristic value if the continuity is above a predetermined level; means for determining a level of repetition of the video signal in the commercial candidate section and for increasing a commercial characteristic value if the repetition is above a predetermined level; means for detecting a telop in the video signal of the commercial candidate section and for increasing a commercial characteristic value if a telop is detected; means for detecting a character in the video signal of the commercial candidate section and for increasing a commercial characteristic value if a character is detected; means for determining the quietness rate of the commercial candidate section and for increasing a commercial characteristic value if the quietness rate is below a predetermined level; and means for judging whether or not the commercial candidate section is a commercial, based on the commercial characteristic value resulting from the operations of the frequency determining means, the periodicity determining means, the continuity determining means, the repetition determining means, the telop determining means, the character determining means and the quietness rate determining means.

According to another aspect of the invention, there is provided an apparatus for processing a television signal which includes: means for receiving the television signal; means for determining a quiet threshold value from the television signal; means for making a comparison of the audio signal and the quiet threshold value; and means for judging whether or not a portion of the television signal is a commercial candidate section according to the comparison.

According to another aspect of the invention, there is provided an apparatus for processing a television signal which includes: a receiver for receiving a television signal; a first detector for detecting a commercial candidate section in the television signal; a second detector for detecting characteristics of the commercial candidate section; and a judgment circuit for judging whether or not the commercial candidate section is a commercial, based on the characteristics detected by the second detector.

According to another aspect of the invention, there is provided an apparatus for processing a television signal which includes: a receiver for receiving a television signal; a commercial candidate section detecting circuit for detecting a commercial candidate section in the television signal; a commercial characteristic value counter for storing a previous commercial characteristic value, for receiving a commercial characteristic value signal and for adding a commercial characteristic value from the commercial characteristic value signal to the previous commercial characteristic value; a frequency determining circuit for determining a frequency of scene changes in the commercial candidate section and for sending a commercial characteristic value signal to the commercial characteristic value counter if the frequency of scene changes is above a predetermined level; a periodicity determining circuit for detecting whether or not the audio signal in the commercial candidate section has a periodicity, for calculating a level of periodicity detected and for sending a commercial characteristic value signal to the commercial characteristic value counter if the calculated periodicity is above a predetermined level; a continuity determining circuit for determining a level of continuity of the periodicity of the audio signal in the commercial candidate section and for sending a commercial characteristic value signal to the commercial characteristic value counter if the continuity is above a predetermined level; a repetition determining circuit for determining a level of repetition of the video signal in the commercial candidate section and for sending a commercial characteristic value signal to the commercial characteristic value counter if the repetition is above a predetermined level; a telop detecting circuit for detecting a telop in the video signal of the commercial candidate section and for sending a commercial characteristic value signal to the commercial characteristic value counter if a telop exists; a character detecting circuit for detecting a character in the video signal of the commercial candidate section and for sending a commercial characteristic value signal to the commercial characteristic value counter if a character is detected; a quietness rate determining circuit for determining the quietness rate of the commercial candidate section and for sending a commercial characteristic value signal to the commercial characteristic value counter if the quietness rate is below a predetermined level; and a judgement circuit for judging whether or not the commercial candidate section is a commercial, based on the commercial characteristic value in the commercial characteristic value counter.

According to another aspect of the invention, there is provided an apparatus for processing a television signal which includes: a receiver for receiving the television signal; a quiet threshold value determining circuit for determining a quiet threshold value from the television signal; a comparitor for making a comparison of the audio portion of the television signal and the quiet threshold value; and a judging circuit for judging whether or not a portion of the television signal is a commercial candidate section according to the comparison.

According to another aspect of the invention, there is provided a method for processing a television signal which includes the following steps: receiving a television signal; detecting a commercial candidate section in the television signal; determining characteristics of the commercial candidate section; and judging whether or not the commercial candidate section is a commercial, based on the characteristics detected in the determining step.

According to another aspect of the invention, there is provided a method for processing a television signal which includes the following steps: receiving a television signal; detecting a commercial candidate section in the television signal; determining a frequency of scene changes in the commercial candidate section and increasing a commercial characteristic value if the frequency of scene changes is above a predetermined level; determining a periodicity of the audio signal in the commercial candidate section and increasing a commercial characteristic value if the periodicity is above a predetermined level; determining a continuity of a periodicity of the audio signal in the commercial candidate section and increasing a commercial characteristic value if the continuity is above a predetermined level; detecting a repetition of the video signal in the commercial candidate section and increasing a commercial characteristic value if the repetition is above a predetermined level; searching for a telop in the video signal of the commercial candidate section and increasing a commercial characteristic value if a telop is detected; searching for a character in the video signal of the commercial candidate section and increasing a commercial characteristic value if a characters is detected; determining the quietness rate of the commercial candidate section and increasing a commercial characteristic value if the quietness rate is below a predetermined level; and judging whether or not the commercial candidate section is a commercial, based on the commercial characteristic value after the preceding steps are performed.

According to another aspect of the invention, there is provided a method of processing a television signal which includes the following steps: receiving the television signal; determining a quiet threshold value from the television signal; making a comparison of the audio signal and the quiet threshold value; and judging whether or not a portion of the television signal is a commercial candidate section according to the comparison.

According to another aspect of the invention, there is provided a provision medium for providing a program which is readable by a computer to control an apparatus to execute a detection routine for detecting commercials included in a television broadcast, wherein the detection routine includes the following steps: receiving a television signal; detecting a commercial candidate section in the television signal; detecting characteristics of the commercial candidate section; and judging whether or not the commercial candidate section is a commercial, based on the characteristics detected in the determining step.

According to another aspect of the invention, a provision medium provides a program which is readable by a computer to control an apparatus to execute a detection routine for detecting commercials included in a television broadcast, wherein the detection routine includes the following steps: receiving a television signal; detecting a commercial candidate section in the television signal; determining a frequency of scene changes in the commercial candidate section and increasing a commercial characteristic value if the frequency of scene changes is above a predetermined level; determining a periodicity of the audio signal in the commercial candidate section and increasing a commercial characteristic value if the periodicity is above a predetermined level; determining a continuity of a periodicity of the audio signal in the commercial candidate section and increasing a commercial characteristic value if the continuity is above a predetermined level; detecting a repetition of the video signal in the commercial candidate section and increasing a commercial characteristic value if the repetition is above a predetermined level; searching for a telop in the video signal of the commercial candidate section and increasing a commercial characteristic value if a telop is detected; searching for a character in the video signal of the commercial candidate section and increasing a commercial characteristic value if a characters is detected; determining the quietness rate of the commercial candidate section and increasing a commercial characteristic value if the quietness rate is below a predetermined level; and judging whether or not the commercial candidate section is a commercial, based on the commercial characteristic value after the preceding steps are performed.

According to another aspect of the invention, a provision medium provides a program which is readable by a computer to control an apparatus to execute a detection routine for detecting commercials included in a television broadcast, wherein the detection routine includes the following steps: receiving the television signal; determining a quiet threshold value from the television signal; making a comparison of the audio signal and the quiet threshold value; and judging whether or not a portion of the television signal is a commercial candidate section according to the comparison.

These and other objects, features and advantages will become apparent when considered with reference to the following description and the accompanying drawings.

BRIEF DESCRIPTION OF THE DRAWINGS

FIGS. 12(A) and 12(C) is a diagram showing an embodiment of the processing of commercial candidate section detector 16;

FIGS. 14(A) and 14(G) is a diagram showing the processing of an embodiment of commercial candidate section detector 16;

FIGS. 15(A) and 15(C) is a diagram showing the processing of an embodiment of commercial candidate section detector 16;

FIGS. 17(A) and 17(E) is a diagram showing the processing of an embodiment of commercial block detector 21 of FIG. 16;

FIGS. 18(A) and 18(E) is a diagram showing the processing of an embodiment of commercial block detector 21 of FIG. 16;

FIG. 19 is a block diagram showing a third embodiment of commercial detection circuit 3 of FIG. 1;

DETAILED DESCRIPTION OF THE PREFERRED EMBODIMENTS

Figure 1:
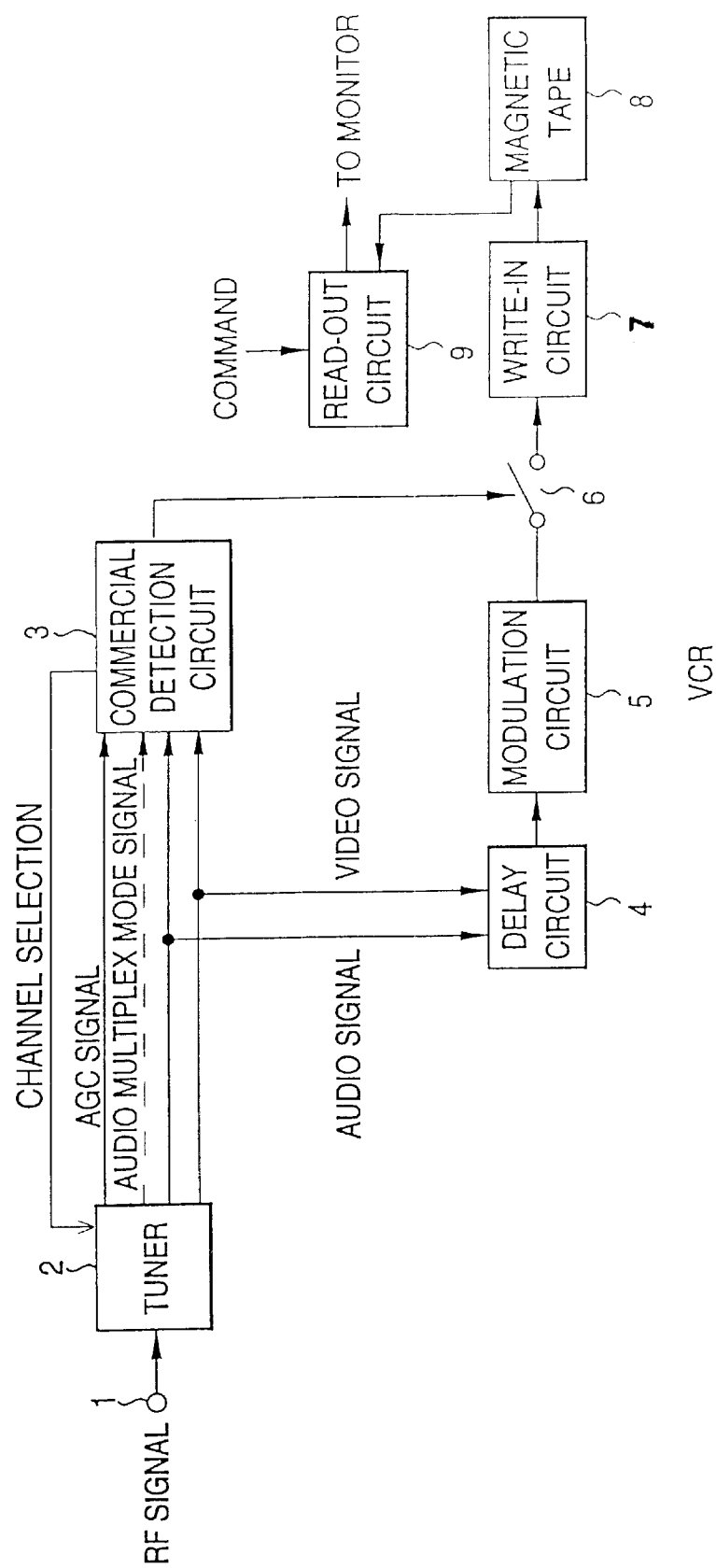
FIG. 1 is a block diagram showing a first embodiment of a video recorder to which the present invention is applied.

A first embodiment of a video recorder to which the present invention is applied will be described with reference to FIG. 1.

Tuner 2 of a recording system decodes an RF signal of television broadcast input from a terminal 1 and outputs a video signal, an audio signal, an AGC signal and, optionally, a signal representing a sound multiplex mode (hereinafter referred to as a "sound multiplex mode signal" or "audio multiplex mode signal") to commercial detection circuit 3. Tuner 2 outputs the video signal and the audio signal to a delay circuit 4.

Commercial detection circuit 3 judges whether the signal input from the tuner 2 is a commercial or not, and outputs "0" or "1" as a control signal to switch 6 in accordance with the judgment result. When the control signal represents "1," switch 6 is switched off, and when the control signal represents "0," switch 6 is switched on.

Delay circuit 4 delays the video signal and the audio signal input from tuner 2 by only the time required to perform the processing of commercial detection circuit 3 (in this embodiment, 1 minute), and then outputs the processed signals to modulation circuit 5. Modulation circuit 5 compresses the video signal and the audio signal input from delay circuit 4 in a predetermined format (for example, the MPEG2 format), and further modulates the signal by a predetermined modulation method (for example, EFM modulation). The modulated signal thus obtained is output to write-in circuit 7 through switch 6. Write-in circuit 7 records the input modulated signal on magnetic tape 8.

Reading circuit 9 of a reproduction system reads and decodes signals recorded in magnetic tape 8 in accordance with a command input from a user, and supplies the signal thus decoded to a monitor (not shown).

The medium in which the video signal and the audio signal are recorded is not limited to magnetic tape: the medium may be an optical disc, a magneto-optical disc, a hard disc, a semiconductor memory or the like.

Figure 2:
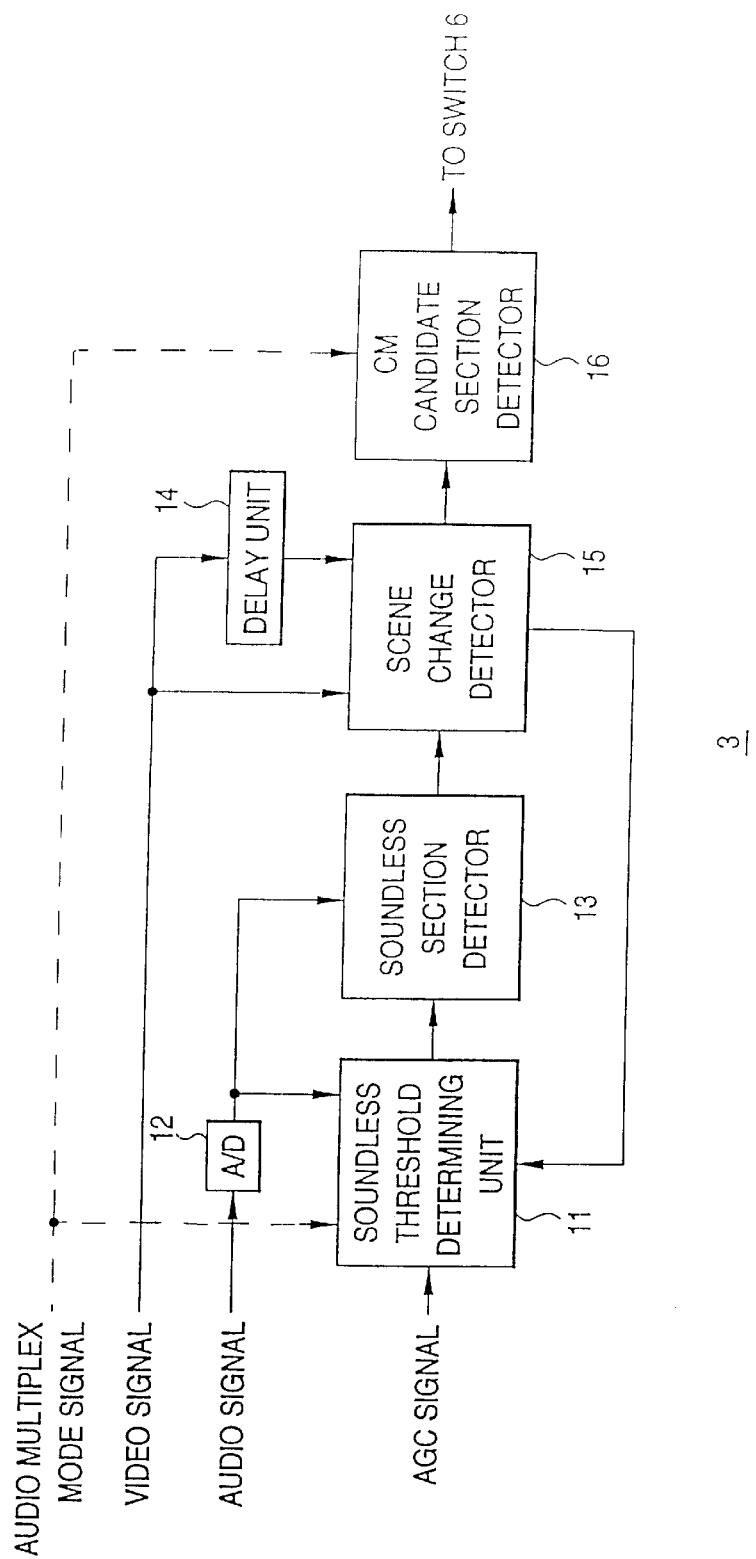
FIG. 2 is a block diagram showing a first embodiment of commercial detection circuit 3 of FIG. 1.

FIG. 2 shows a first embodiment of commercial detection circuit 3 of FIG. 1. In commercial detection circuit 3, the sound multiplex mode signal input from tuner 2 is supplied to quiet threshold value determining unit 11 and commercial candidate section detector 16. The video signal is supplied to delay unit 14 and scene change detector 15, the audio signal is supplied to A/D converter 12, and the AGC signal is supplied to quiet threshold value determining unit 11.

Quiet threshold value determining unit 11 calculates a threshold value used in the quiet section detection processing by using the sound multiplex mode signal, the audio signal digitized in A/D converter 12, the AGC signal or scene change detector 15 (or a combination thereof), and supplies the threshold value thus calculated to quiet section detector 13.

Quiet section detector 13 compares the level of the digitized audio signal input from A/D converter 12 with the threshold value supplied from quiet threshold value determining unit 11 to detect quiet sections, and outputs the comparison result to scene change detector 15.

Scene change detector 15 compares two frame images which are simultaneously input (a current frame and a previous frame which is delayed by the time corresponding to one frame [1/30 second] in delay unit 14), thereby detecting the presence or absence of a scene change in the quiet section, and then outputs the result to commercial candidate section detector 16.

Commercial candidate section detector 16 converts the information of the scene change supplied from the sound multiplex mode signal and the scene change detector 15 to binary signals, stores the binary signals into the built-in memory, and detects a commercial candidate section on the basis of the foregoing information. Note that in alternative embodiments, some of which are described below, other information can be used to detect a CM candidate.

Thereafter, commercial candidate section detector 16 outputs "1" as the control signal to the switch 6 in the commercial candidate section, and outputs "0" as the control signal in sections other than the commercial candidate section. Information from the previous minute is stored in the memory contained in commercial candidate section detector 16. In this case, the capacity of the memory is equal to: 60 (seconds)×30 (frames)×2 (data)×1 (bit).

Next, the operation of commercial detection circuit 3 will be described with reference to the flowchart of FIG. 3. The commercial detection processing is started when each signal is input from the tuner 2 to the commercial detection circuit 3. In step S1, quiet threshold value determining unit 11 of commercial detection circuit 3 outputs to quiet section detector 13 the threshold value which is calculated beforehand (as described below) and used in the quiet section detection processing of step S2.

Figure 4:
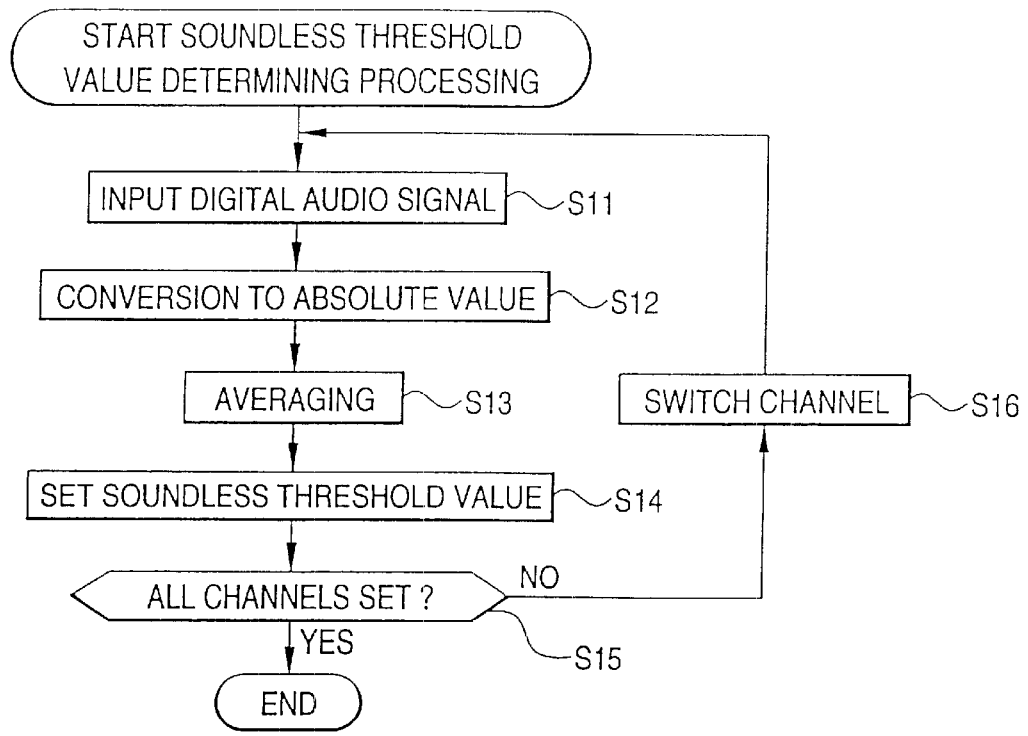
FIG. 4 is a flowchart showing the processing of quiet threshold value determining unit 11 of FIG. 2.

The details of the quiet threshold value processing will now be described with reference to the flowchart of FIG. 4. In the following description, quiet threshold value determining unit 11 performs many different functions. In practice, these functions could be performed by one component or by two or more components.

In step S11, the A/D converter 12 digitizes an audio signal (analog signal) of a predetermined minute of time input from tuner 2 at a predetermined sampling frequency and a predetermined quantizing level, and outputs the digital audio signal thus obtained (for example, FIG. 5A) to quiet threshold value determining unit 11. In other embodiments, lengths of time other than one minute may be used. For embodiments in which digital signals are input, the digitizing step is omitted.

Figure 5:
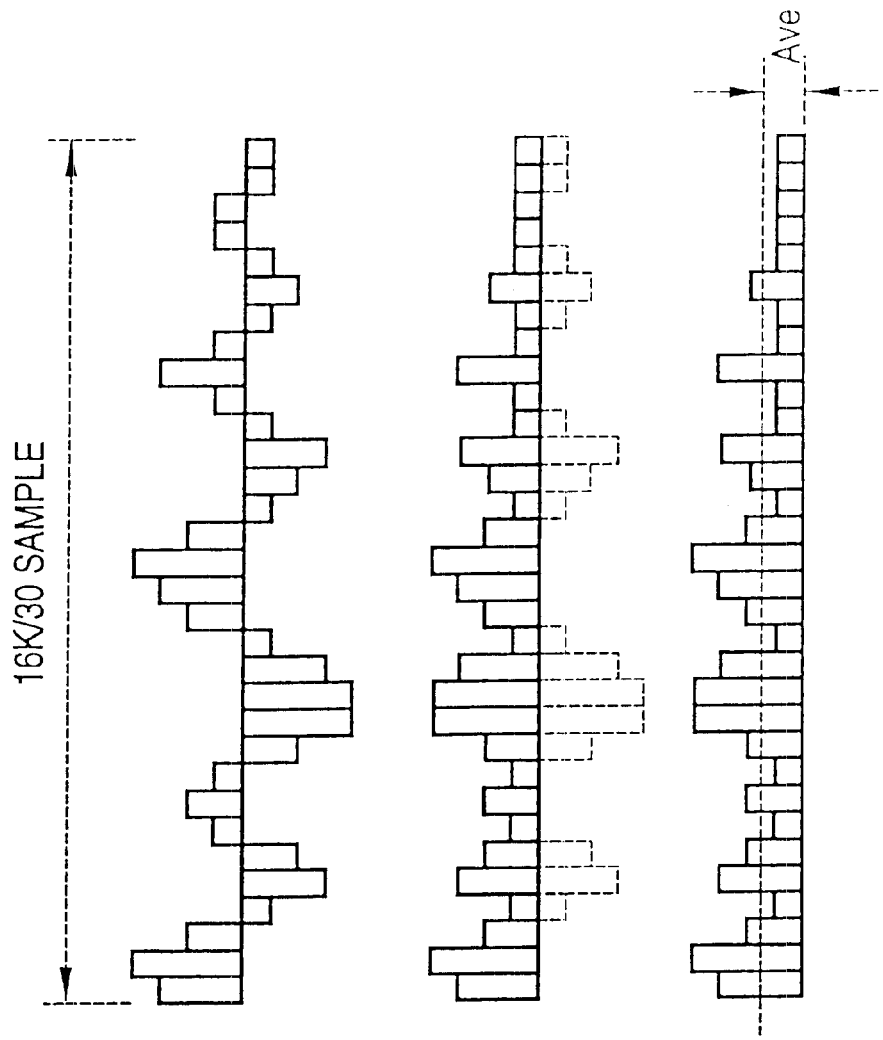
FIGS. 5(A) and 5(C) is a diagram showing the operation of quiet threshold value determining unit 11 of FIG. 2.

In step S12, quiet threshold value determining unit 11 converts the digital audio signal input from A/D converter 12 to absolute values as shown in FIG. 5B, and in step S13 calculates the average of the absolute values of the samples (FIG. 5C).

In step S14, quiet threshold value determining unit 11 compares the average value obtained in step S13 with the threshold value which has been stored until that time, and the smaller of these two values is stored as the new threshold value.

In step S15, quiet threshold determining unit 11 judges whether the processing of steps S11 to S14 has been carried out on all the channels. If it is judged that the processing has not been carried out on all the channels, the processing goes to step S16. In step S16, quiet threshold value determining unit 11 outputs a channel switching signal to tuner 2. The channel is switched in accordance with the channel switching signal.

Thereafter, if it is judged in step S15 that the processing from the steps S11 to the step S14 has been carried on all the channels, the quiet threshold value determining processing is completed. The quiet threshold value determining processing is repeated at a predetermined interval (for example, every 10 minutes) at all times.

Note that all channels need not be used in this process. In other embodiments of this process, not all of the channels are used.

Another method for determining the quiet threshold value will now be described. At a broadcast start time and a broadcast end time of each channel, a video signal exists but the level of an audio signal should be equal to 0. At these times, the audio signal is received and a value (n+Δ), obtained by adding the level n of the audio signal with a predetermined offset value Δ, may be set as a quiet threshold value. In this case, the broadcast start time and the broadcast end time of each channel are assumed to be known.

Figure 6:
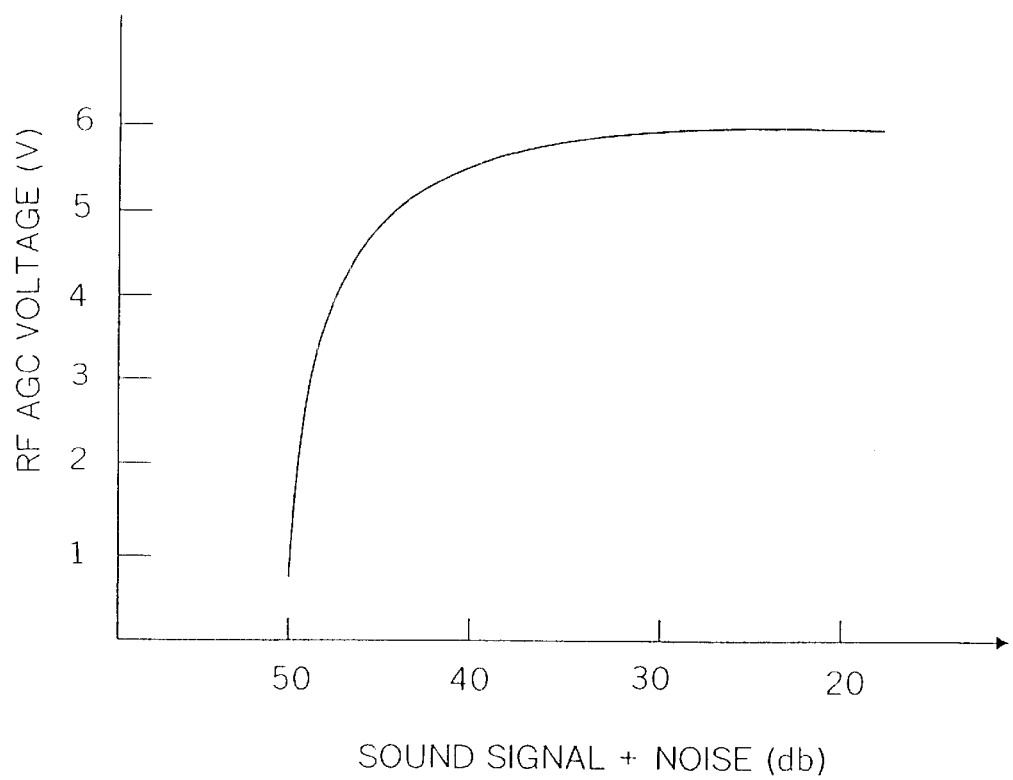
FIG. 6 is a diagram showing the operation of quiet threshold value determining unit 11 of FIG. 2.

The quiet threshold value may also be determined by using the AGC signal from the tuner 2. That is, the level of the AGC signal from the tuner 2 and the amplitude of the audio signal plus noise have a predictable relationship to each other, as shown in FIG. 6.

Accordingly, by estimating the amplitude of the audio signal plus noise from the level of the AGC signal, the threshold value corresponding to the amplitude thus estimated can be uniquely determined.

Figure 7:
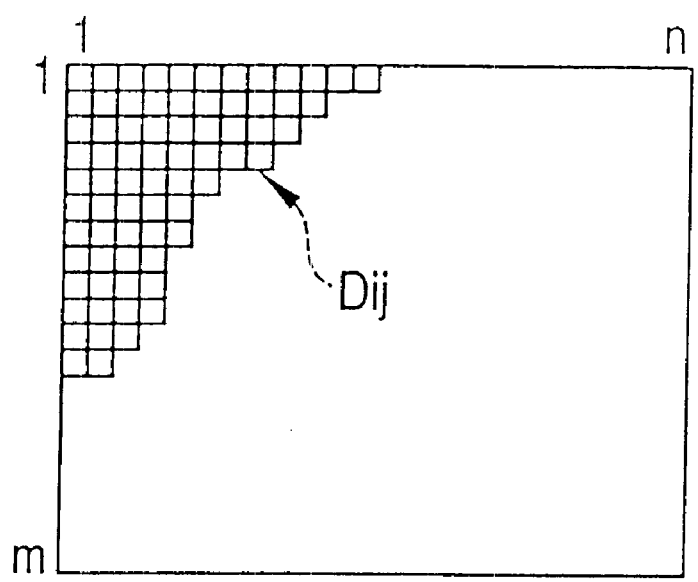
FIG. 7 is a diagram showing the operation of quiet threshold value determining unit 11 of FIG. 2.

In addition, the buzz component of the audio signal is dependent on the brightness level of the video signal, and thus the quiet threshold value may be determined by using the average value of the brightness level of the video signal. For example, when the average value of the brightness level is high, the buzz component of the audio signal is increased and consequently the level of the audio signal is increased for a fixed period. Therefore, the threshold value is set to a higher value than the usual case. When the average value of the brightness level is low, the buzz component of the audio signal is reduced and consequently the level of the audio signal is reduced for a fixed period. Therefore, the threshold value is set to a lower value than the usual case. The average value $Y_A$ of the brightness of the video signal is calculated according to the following equation in scene change detector 15:

$$Y_A = (\Sigma D_{ij})/(n \times m),$$

where i=1 to n, j=1 to m and $D_{ij}$ represents a pixel value at coordinate (i, j) of the image corresponding to the audio signal, as shown in FIG. 7.

The quiet threshold value may also be determined on the basis of the audio multiplex mode signal. That is, the level of the audio signal may be the quiet threshold value when the audio multiplex mode is changed from a bilingual broadcast to a stereo broadcast.

Figure 8:
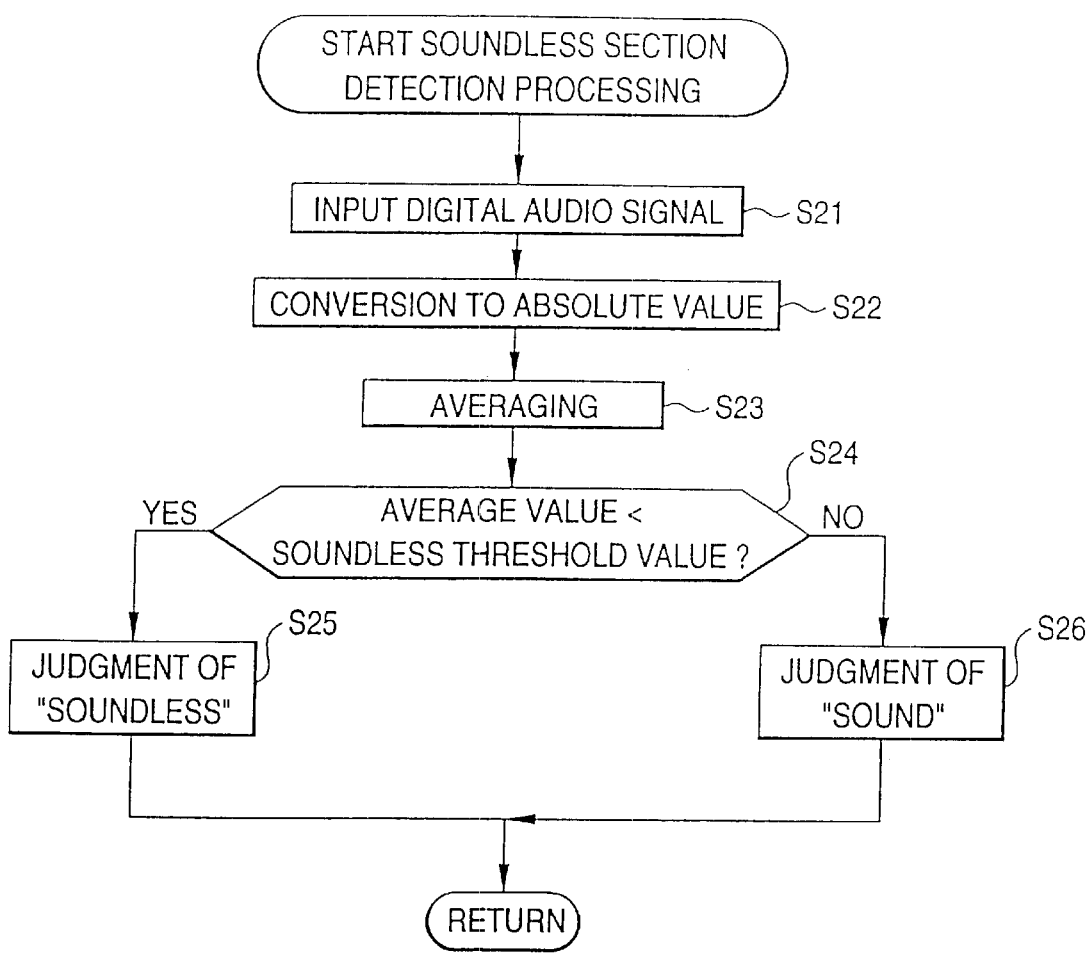
FIG. 8 is a flowchart showing the quiet section detection processing of step S2 of FIG. 3.

Returning to FIG. 3, in step S2 quiet section detector 13 detects a quiet section on the basis of the threshold value which is input from quiet threshold value determining unit 11 in step S1. The details of the quiet section detection processing will be described with reference to the flowchart of FIG. 8.

In step S21, the A/D converter 12 digitizes an audio signal (an analog signal) of a predetermined minute of time input from tuner 2 at a predetermined sampling frequency and a predetermined quantization level, and outputs the digital audio signal thus obtained (for example, as shown in FIG. 5A) to quiet threshold value determining unit 11. As noted above, for embodiments in which a digital signal is input, the digitizing step is omitted. In step S22, the digital audio signal input from A/D converter 12 is converted to absolute values as shown in FIG. 5B, and in step S23 the average absolute value of the samples thus obtained is calculated (FIG. 5C) by quiet section detector 13.

In step S24, quiet threshold value determining unit 11 judges whether the average value obtained in step S23 is smaller than the threshold value input from quiet threshold value determining unit 11. If it is judged that the average value is smaller than the threshold value, the processing goes to step S25. In step S25, quiet section detector 13 judges this section as a quiet section, and outputs the information thereof to scene change detector 15.

Conversely, if it is judged in step S24 that the average value is not smaller than the threshold value, the processing goes to step S26. In step S26, quiet section detector 13 judges this section as a section which is not quiet and outputs the information thereof to scene change detector 15.

Figure 3:
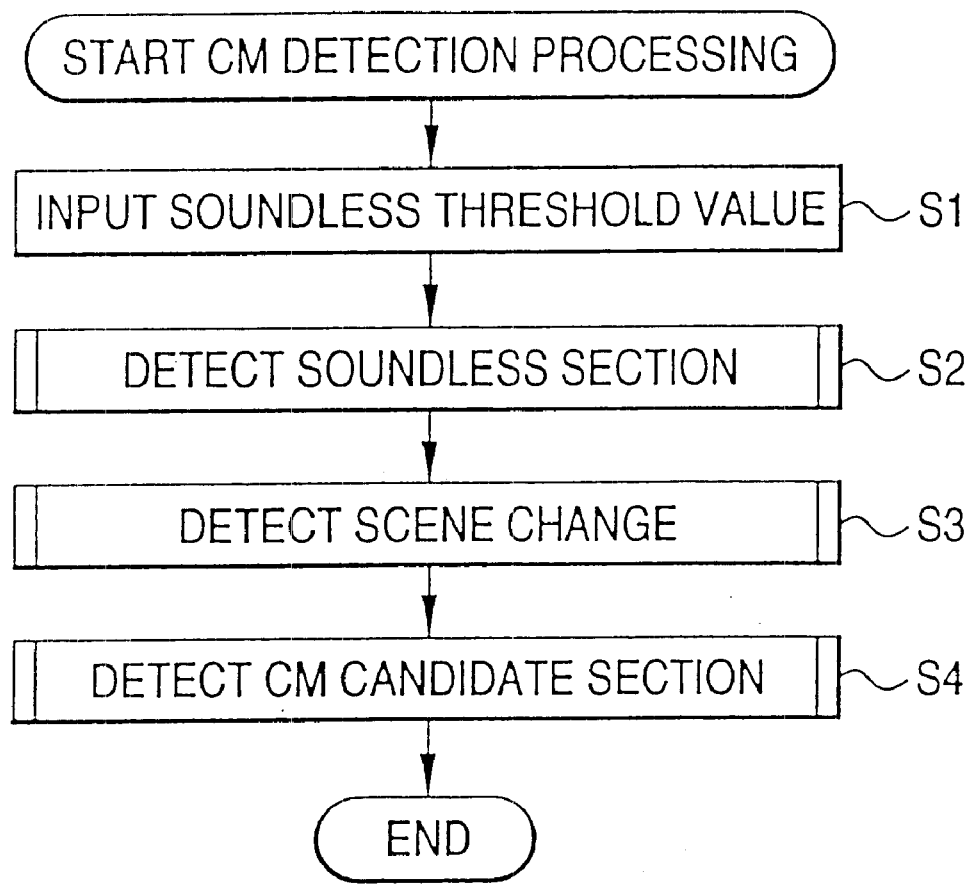
FIG. 3 is a flowchart showing the operation of commercial detection circuit 3.
Figure 9:
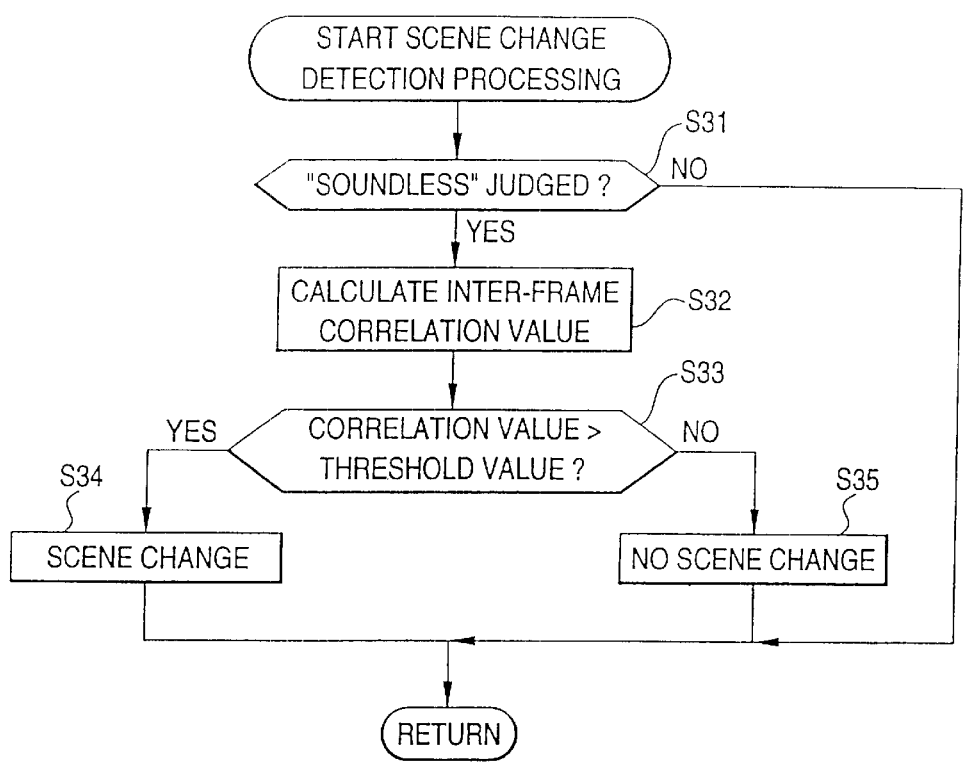
FIG. 9 is a flowchart showing the scene change detection processing of step S3 of FIG. 3.

The processing returns to the step S3 of FIG. 3. In step S3, scene change detector 15 detects the scene change of two input consecutive frames and outputs the detection result to commercial candidate section detector 16. The details of the scene change detection processing will be described with reference to the flowchart of FIG. 9.

In step S31, scene change detector 15 judges whether the information input from quiet section detector 13 indicates a quiet section. If it is judged that the information input indicates the presence of a quiet section, the processing goes to step S32.

Figure 10:
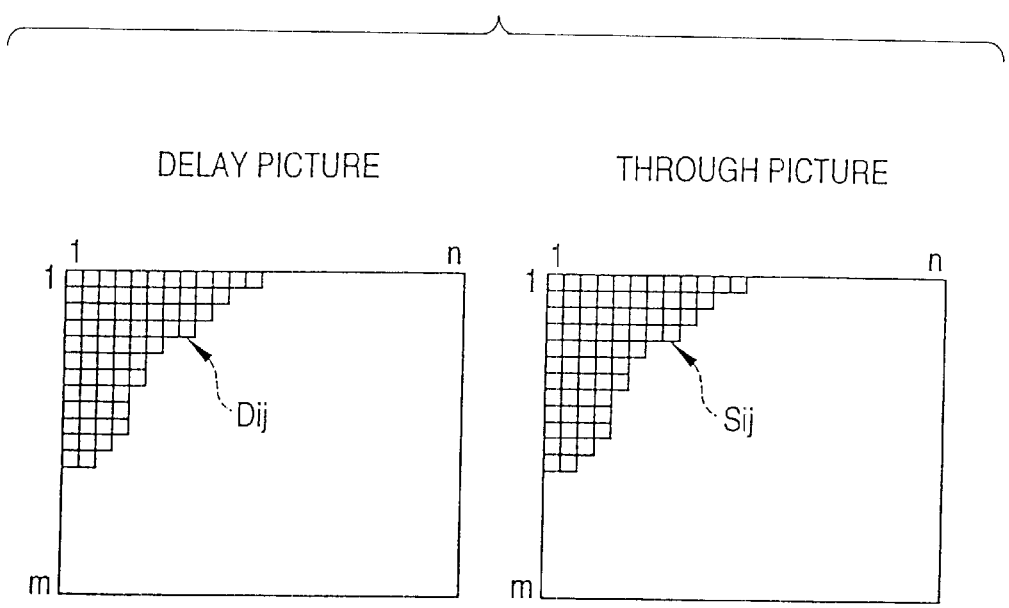
FIG. 10 is a diagram showing scene change detection processing.

In step S32, the scene change detector 15 calculates the inverse correlation value E of two successive frame images. Specifically, as shown in FIG. 10, the sum of the absolute values of the differences between pixel values of corresponding pixels of an image input through delay unit 14 (a delay image) and an image which is not input through delay unit 14 (a through image) is calculated according to the following equation as the inverse correlation value:

$$E = (|D_{ij} - S_{ij}|)$$

$D_{ij}$ and $S_{ij}$ represent the pixel values at the coordinate (i, j) of the delay image and the through image, respectively. The inverse correlation value is larger as the degree of the correlation between the frames is reduced. On the other hand, as the degree of the correlation between the frames is increased, the inverse correlation value is smaller.

Another method of calculating the inverse correlation value E is to use histograms of the pixel values of the delay image and the through image. Alternatively, the delay image and the through image may be divided into predetermined blocks and then the inverse correlation value may be calculated from the differences of the pixel values in some or all of the blocks.

In step S33, scene change detector 15 judges whether the inverse correlation value obtained in step S32 is larger than a predetermined threshold value. If the inverse correlation value is larger than the predetermined threshold value (the degree of the correlation between the frames is smaller), the processing goes to step S34.

In step S34, scene change detector 15 judges whether a scene change exists between the two successive frames and outputs the result to commercial candidate section detector 16.

Conversely, in step S33, if the inverse correlation value is not larger than the predetermined threshold value (the degree of the correlation between the frames is larger), the processing goes to step S35.

In step S35, scene change detector 15 judges that no scene change exists between the two successive frames, and outputs the information thereof to commercial candidate section detector 16.

In step S31, if it is judged that the information does not indicate a quiet section, the information is output to commercial candidate section detector 16 and the processing returns to the step S4 of FIG. 3.

In step S4, commercial candidate section detector 16 judges the commercial candidate section on the basis of the frame-based audio multiplex mode signal of the previous minute of stored binary data in the built-in memory and the information from the scene change detector 15. Note that in other embodiments, the audio multiplex signal need not be used to determine commercial candidate sections.

Figure 11:
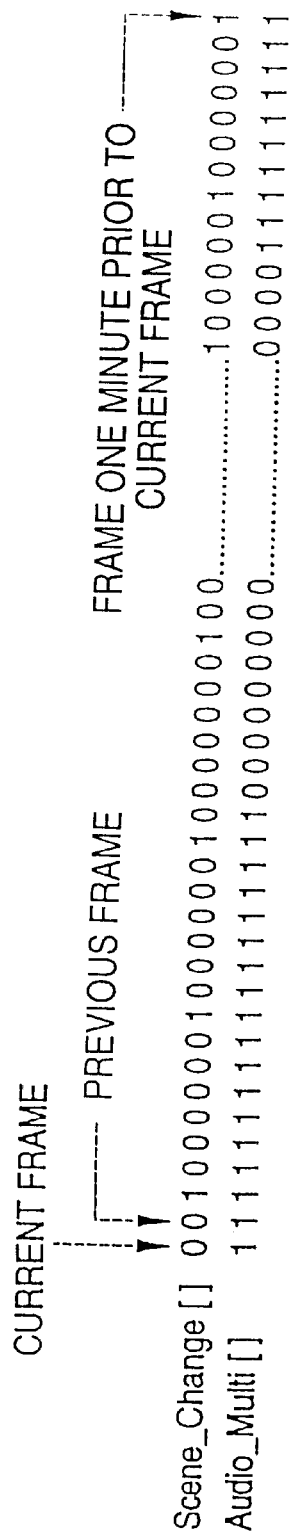
FIG. 11 is a diagram showing information recorded in a memory in an embodiment of commercial candidate section detector 16.

As shown in FIG. 11, the following data are stored in the memory contained in commercial candidate section detector 16: with respect to the audio multiplex mode signal (Audio_Multi[ ]), "1" is recorded for the stereo mode while "0" is recorded for the monaural mode and the bilingual mode, and with respect to the information (Scene_Change[ ]) input from the scene change detector 15, "1" is recorded for a frame which is a scene change corresponding to the scene change while "0" is recorded for a frame which is not a scene change.

As shown in FIG. 12A, the commercial candidate section detector 16 refers to the built-in memory to partition the sections at every frame (scene change point) in which the signal indicating the scene change is equal to 1 (in this case, the scene change sections 0 to 10) and to divide the number of frames constituting each scene change section by 30, thereby calculating the time of the section. Further, as shown in FIG. 12B, commercial candidate section detector 16 sets a continuous frame having an audio multiplex mode signal of 1 as a stereo section. Still further, as shown in FIG. 12C, commercial candidate section detector 16 judges as a commercial candidate section a section for which the time of a single scene change section (or the total time of plural scene change sections adjacent to the scene change section concerned) is equal to an integral multiple of 15 seconds and which is a stereo section, and outputs "1" as a control signal to the switch 6 in response to such a commercial candidate section. Commercial candidate section detector 16 outputs "0" as a control signal to the switch 6 in response to sections other than a commercial candidate section.

Switch 6 is switched off when the control signal is "1" and switched on when the control signal is "0". Switch 6 is supplied with the modulated video signal and the audio signal input from modulation circuit 5. The video signal and the audio signal are in synchronization with the control signal from commercial candidate section detector 16, because these signals are delayed by only one minute in delay circuit 4. Therefore, only the video signal and audio signal of the program are supplied to those parts to the circuit which are subsequent to switch 6, and the video signal and audio signal of the commercial candidate sections are not supplied thereto. Accordingly, only the program is recorded in magnetic tape 8.

Next, another embodiment of the commercial candidate section detector 16 will be described. A general tendency of commercials is that they have many scene changes. In this embodiment, the characteristic of multiple scene changes is used to identify a commercial candidate section.

Figure 13:
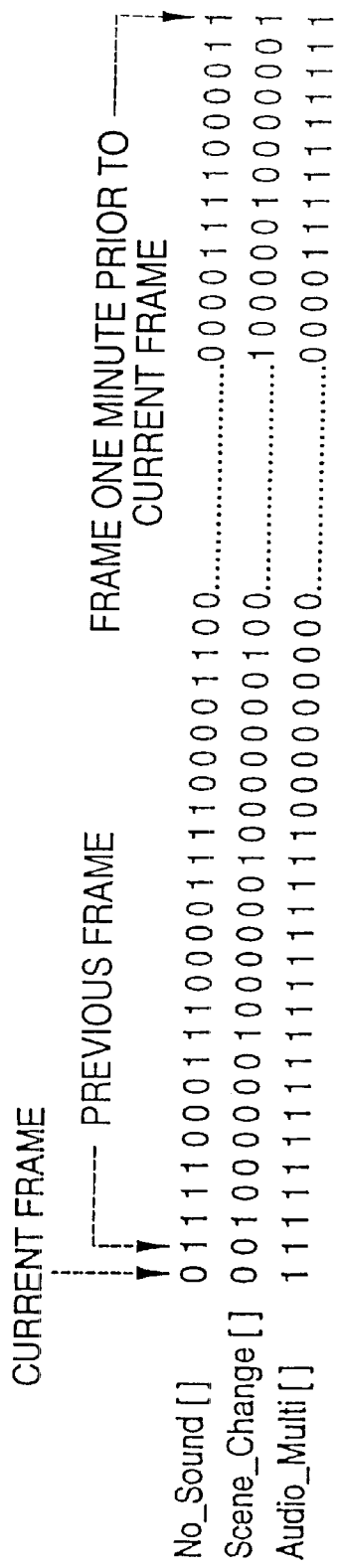
FIG. 13 is a diagram showing information recorded in the memory in another embodiment of commercial candidate section detector 16.

As shown in FIG. 13, the memory contained in commercial candidate section detector 16 records not only the information as shown in FIG. 11, but also information (No_Sound[ ]) indicating a quiet section which is an output of quiet section detector 13 ("0" for a sound portion and "1" for a quiet portion). In this case, the following capacity is needed to the built-in memory: 60(seconds)×30(frames)×3 (data)×1(bit).

Commercial candidate section detector 16 refers to the built-in memory to extract a quiet section as shown in FIG. 14A, extract a scene change point as shown in FIG. 14B, partition the scene change section at every scene change point in the quiet section (in the case of FIG. 14C, scene change sections 0 to 10) and divide the number of frames constituting each scene change section by 30, thereby calculating the time of the section.

Commercial candidate section detector 16 extracts a section which is grouped so that the time of the single scene change section (or the total time of plural scene change sections adjacent to the scene change section concerned) is equal to an integral multiple of 15 seconds, as shown in FIG. 14D, and, in this embodiment, whose audio multiplex mode signal is "1," as shown in FIG. 14E. Then, commercial candidate section detector 16 groups the sections and judges that a section which is grouped at an integral multiple of 15 seconds, as shown in FIG. 14F, and is a stereo section (in this case, sections a to c, and sections d and e), is a commercial candidate section. Further, as shown in FIG. 14G, commercial candidate section detector 16 compares a predetermined threshold value (for example, "1") with the frequency of the scene change in the commercial candidate sections (in this case, the commercial candidate sections a, c, d and e) at both sides of the adjacent commercial candidate section, and judges that a commercial candidate section (in this case, the commercial candidate sections a and c) having a scene change frequency larger than the threshold value is a commercial section. Commercial candidate section b, sandwiched between the commercial candidate sections a and c, is also judged as a commercial section.

Commercial candidate section detector 16 outputs "1" as a control signal to the switch 6 in response to a commercial section, and outputs "0" as a control signal to the switch 6 in response to sections other than a commercial section.

Next, another embodiment of the commercial candidate section detector 16 will be described. In this embodiment, when a characteristic unique to commercials is altered (for example, the time of a commercial is changed from an integral multiple of 15 seconds to an integral multiple of 14 seconds or the like), the reference value used for the judgment of the commercial candidate section is changed accordingly.

In the above operation, commercial candidate section detector 16 refers to the built-in memory (e.g., as shown in FIG. 11) to partition the scene change section at every frame whose scene change signal is "1" (in this case, scene change sections 0 to 10) and divide the number of frames constituting each scene change section by 30, thereby calculating the time of the section as shown in FIG. 15A. In this embodiment, commercial candidate section detector 16 sets as a stereo section a continuous frame whose audio multiplex mode signal is "1," as shown in FIG. 15B.

Here, commercial candidate section detector 16 compares the time of the stereo section with the time of a non-stereo section which is adjacent to the stereo section concerned. If the time of the stereo section is sufficiently shorter, the stereo section (for example, scene change sections 1 to 4 and scene change sections 8 and 9) is judged as a commercial candidate section.

Since the total time of the commercial candidate sections (the scene change sections 1 to 4) is equal to 56 seconds, commercial candidate section detector 16 judges that the time of commercials is on a 7-second basis, a 14-second basis or a 28-second basis. Further, since the scene change is carried out at a time interval of 14 seconds or 28 seconds, commercial candidate section detector 16 finally judges that the time of commercials is equal to an integral multiple of 14 seconds.

When the above result (the judgement that the time of a commercial is equal to an integral multiple of 14 seconds) is continuously obtained at a predetermined number of times or more, commercial candidate section detector 16 judges that the time of a commercial has been changed to an integral multiple of 14 seconds, and then uses an integral multiple of 14 seconds as a reference value for the detection of commercial candidate sections.

When a characteristic unique to commercials is altered (the alteration of the commercial time as described above, the abolition of the insertion of a black frame or blue frame in America and Europe or the like), the reference value or other reference information for the commercial section judgment which is altered in accordance with the altered absolute characteristic may be supplied from outside of the device to commercial candidate section detector 16. In this case, in commercial candidate section detector 16, reference information for the detection of commercial sections may be stored in a rewritable recording medium such as a flash memory.

Figure 16:
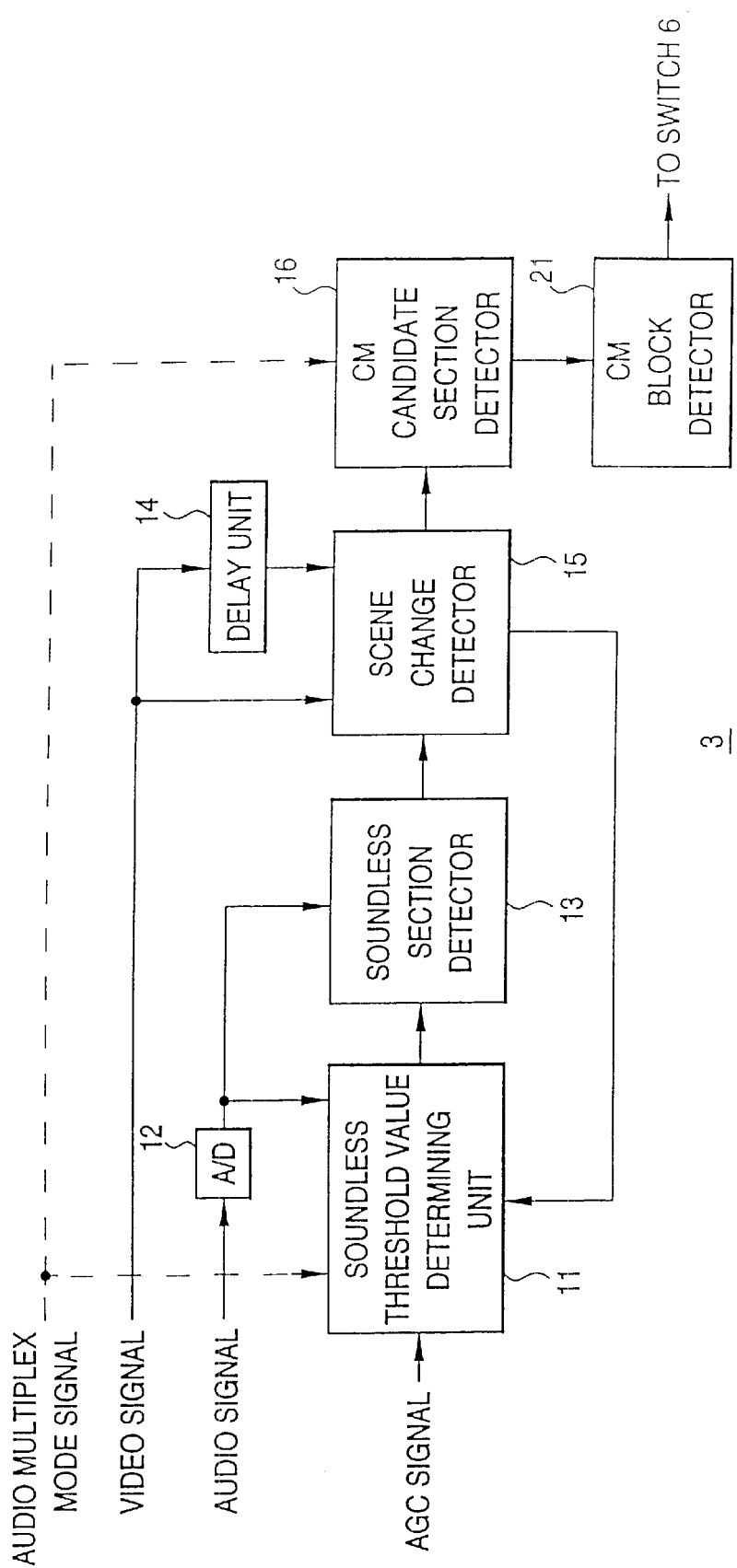
FIG. 16 is a block diagram showing a second embodiment of commercial detection circuit 3 of FIG. 1.

Next, a second embodiment of commercial detection circuit 3 will be described with reference to FIG. 16.

This construction is obtained by adding commercial block detector 21 to the construction shown in FIG. 2. Commercial block detector 21 detects a commercial block comprising a plurality of commercials sandwiched between programs by using the frame number of a single commercial candidate section detected in commercial candidate section detector 16, and outputs a control signal to switch 6 on the basis of the detection result.

According to this construction, the commercial block can be detected by using the following characteristic of commercials: when a plurality of commercials is continuously broadcast, in terms of an individual commercial, each commercial has an error of about 5 frames relative to a standard frame number. However, in terms of a commercial block (continuous plural commercials), each commercial block has an error of about 3 frames for the standard frame number. For example, when four commercials each having a commercial time of 15 seconds are consecutively broadcast, the number of frames of each commercial is equal to 450±5 (=15×30±5). However, the number of frames of each commercial block is not equal to 1800±20 (=15×4× 30±5×4), but is equal to 1800±3.

Next, the operation of the device will be described with reference to FIGS. 17 and 18.

The commercial block detector 21 reads out the frame number of each commercial candidate section a through e (sections 1+2, 3, 4, 8 and 9 of FIG. 17A) detected by commercial candidate section detector 16 and adds the frame number to the frame number of a block of adjacent commercial candidate sections (a "commercial candidate block") to judge whether the total number of frames is within a permitted range of the error (±3). If commercial block detector 21 judges that the total number of frames is within the permitted range of the error, the commercial candidate block is judged as a commercial block. Conversely, if commercial block detector 21 judges that the total number of frames of the error is not within the permitted range of the error, the commercial candidate block is judged not to be a commercial block.

In this example, as shown in, FIGS. 17(A) and 17(E), the total number of frames of commercial candidate sections a through c (sections 1 to 4) is equal to 1803 (=453+446+904), and the error (3) relative to the standard frame number 1800 (=60 seconds×30 frames) is within the permitted range, so that this commercial candidate block is judged as a commercial block. Note that in this instance, scene change sections 1 and 2 have a total time of about 15 seconds and were judged to comprise a single commercial candidate section (a).

On the other hand, the total number of frames of adjacent commercial candidate sections d and e (quiet scene change sections 8 and 9) is equal to 910 (=455+455) and the error (10) relative to the standard frame number 900 (=30 seconds×30 frames) is out of the permitted range, so that this commercial candidate block is judged not to be a commercial block.

When the commercial candidate section is input from the commercial candidate section detector 16, commercial block detector 21 judges quiet scene change sections 1 to 4 (commercial block A) and quiet scene change sections 7 to 10 (commercial block B) as commercial blocks, as shown in FIG. 18C.

Furthermore, commercial block detector 21 reads out from commercial candidate section detector 16 the number of frames of a section (scene change sections 5 and 6) which is sandwiched between the commercial blocks A and B and is not a commercial candidate section. If the number of frames (in this case, 150) is below a predetermined threshold value (for example, 300 frames (10 seconds)), commercial block detector 21 judges the section not to be part of a program, but something like a commercial, and then includes the sandwiched section with the preceding and following commercial blocks A and B. That is, commercial block detector 21 judges the scene change sections 1 to 10 as one commercial block, as shown in FIG. 18D.

Commercial block detector 21 outputs "1" as a control signal to the switch 6 when a commercial block is detected, and outputs "0" as the control signal to the switch 6 when a commercial block is not detected.

Next, a third embodiment of commercial detection circuit 3 will be described with reference to FIG. 19.

This construction is obtained by adding commercial characteristic quantity detector 31 to the first embodiment of FIG. 2. Commercial characteristic quantity detector 31 is supplied with two front and rear frame images (video signals), digitized audio signals, information (e.g., as shown in FIG. 11) stored in the memory contained in commercial candidate section detector 16 and information about the commercial candidate section detected by commercial candidate section detector 16. Commercial characteristic quantity detector 31 judges whether the supplied information has various characteristics of commercials and detects commercial sections on the basis of the resulting judgment. Commercial characteristic quantity detector 31 outputs a control signal to switch 6 in accordance with the detection result.

The operation of commercial characteristic quantity detector 31 will be described with reference to the flowchart of FIG. 20. The commercial characteristic quantity detection processing is executed on each commercial candidate section detected by the commercial candidate section detector 16. Although commercial characteristic quantity detector 31 is described below as having many functions, these functions could be performed by separate elements.

In the embodiment described below, commercial characteristic quantity detector 31 assigns the same value to each commercial characteristic, but these values could be varied to indicate that some commercial characteristics are more likely than others to be associated with a commercial. For example, the telop detection of step S46 and the character detection of step S47 could be assigned a higher value than other commercial characteristics. Moreover, any of the criteria used to detect or verify commercial candidate sections could also be used by commercial characteristic quantity detector 31, e.g., the number of frames of a commercial candidate group or of a commercial candidate, quiet scene change sections or the audio multiplex mode.

In step S41, commercial characteristic quantity detector 31 initializes the commercial characteristic value to 0. In step S42, commercial characteristic quantity detector 31 counts the scene change frequency of the commercial candidate section input from the commercial candidate section detector 16, and judges whether the scene change frequency is above a predetermined threshold value (e.g., 5 per 15 seconds). If it is judged that the measured scene change frequency is above the predetermined threshold value, "1" is added to the commercial characteristic value. Conversely, if it is judged that the measured scene change frequency is less than the predetermined threshold value, no addition is carried out on the commercial characteristic value. This processing is based on a general observation that commercials often have numerous scene changes. In step S42, commercial characteristic quantity detector 31 detects the periodicity of the audio signal of a commercial candidate section. The periodicity detection processing of the audio signal is based on the observation that repeated phrases of background music (e.g., "jingles") are often used in commercials. In the periodicity detection step, the rhythm of background music may also be detected.

Figure 21:
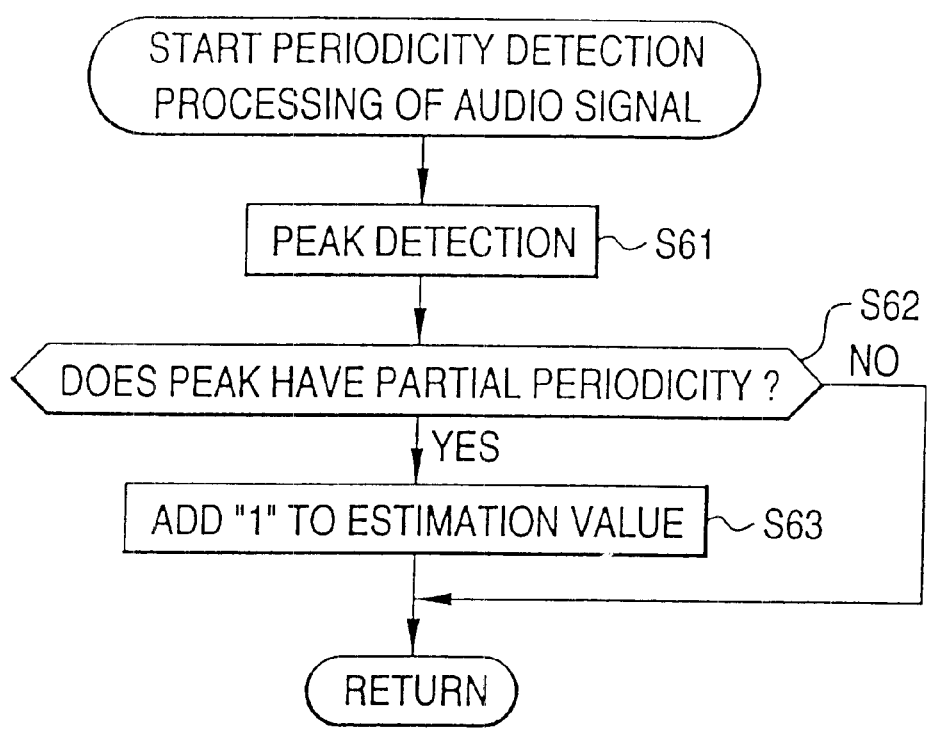
FIG. 21 is a flowchart showing an embodiment of the periodicity detection processing of sound signals of step S43 of FIG. 20.
Figure 22:
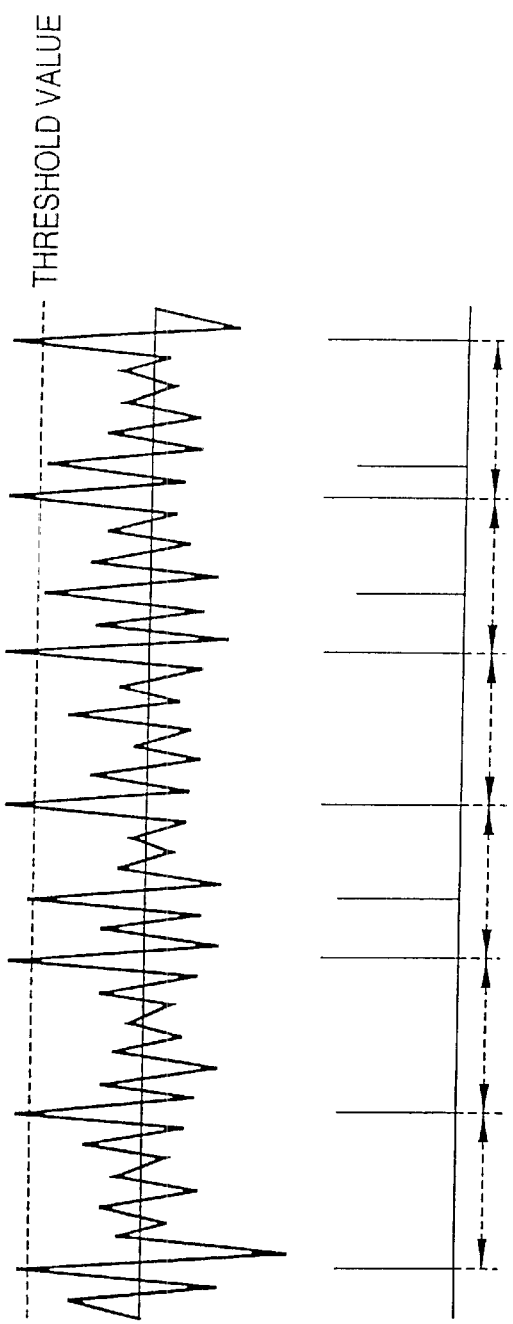
FIGS. 22(A) and 22(B) is a diagram showing an embodiment of the periodicity detection processing of sound signals.

The periodicity detection processing of the audio signal will be described with reference to the flowchart of FIG. 21. In step S61, as shown in FIG. 22, commercial characteristic quantity detector 31 detects as peaks those points at which the level of the audio signal input from A/D converter 12 is greater than or equal to a predetermined threshold value (FIG. 22B). FIG. 22A shows the audio signal as an analog signal.

In step S62, commercial characteristic quantity detector 31 judges whether the peaks detected in step S61 have a longer periodicity than a predetermined period (several seconds). The judgment of the periodicity may be performed by using a FFT (Fast Fourier Transform) or by merely measuring the intervals between peaks. If it is judged that the detected peaks have a longer periodicity than the predetermined period, the processing goes to step S63.

In step S63, commercial characteristic quantity detector 31 adds "1" to the commercial characteristic value. If it is judged in step S62 that the detected peak does not have a longer periodicity than the predetermined period, no addition is carried out on the commercial characteristic value, and thus step S63 is skipped.

Figure 20:
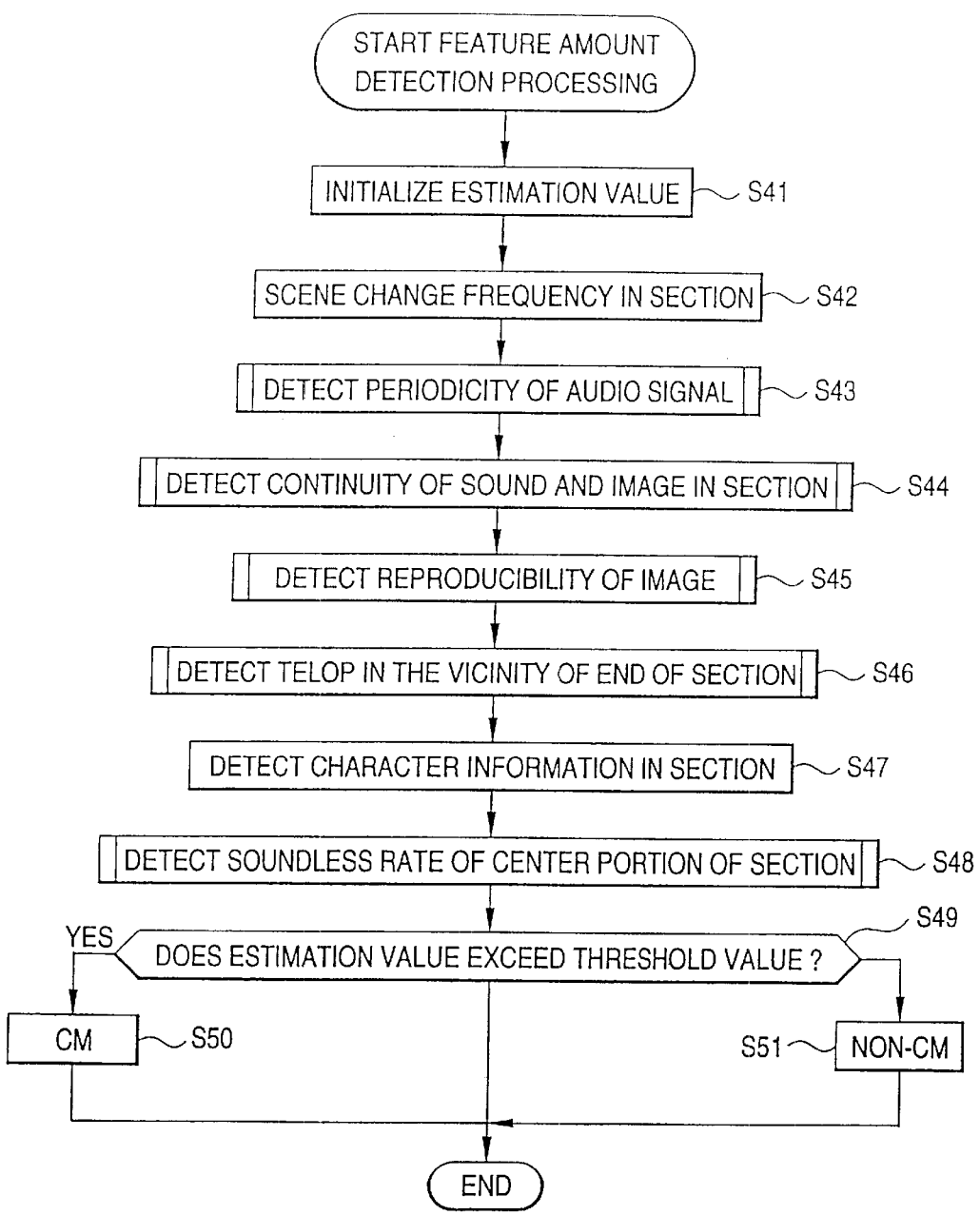
FIG. 20 is a flowchart showing the operation of an embodiment of commercial characteristic quantity detector 31 of FIG. 19.
Figure 23:
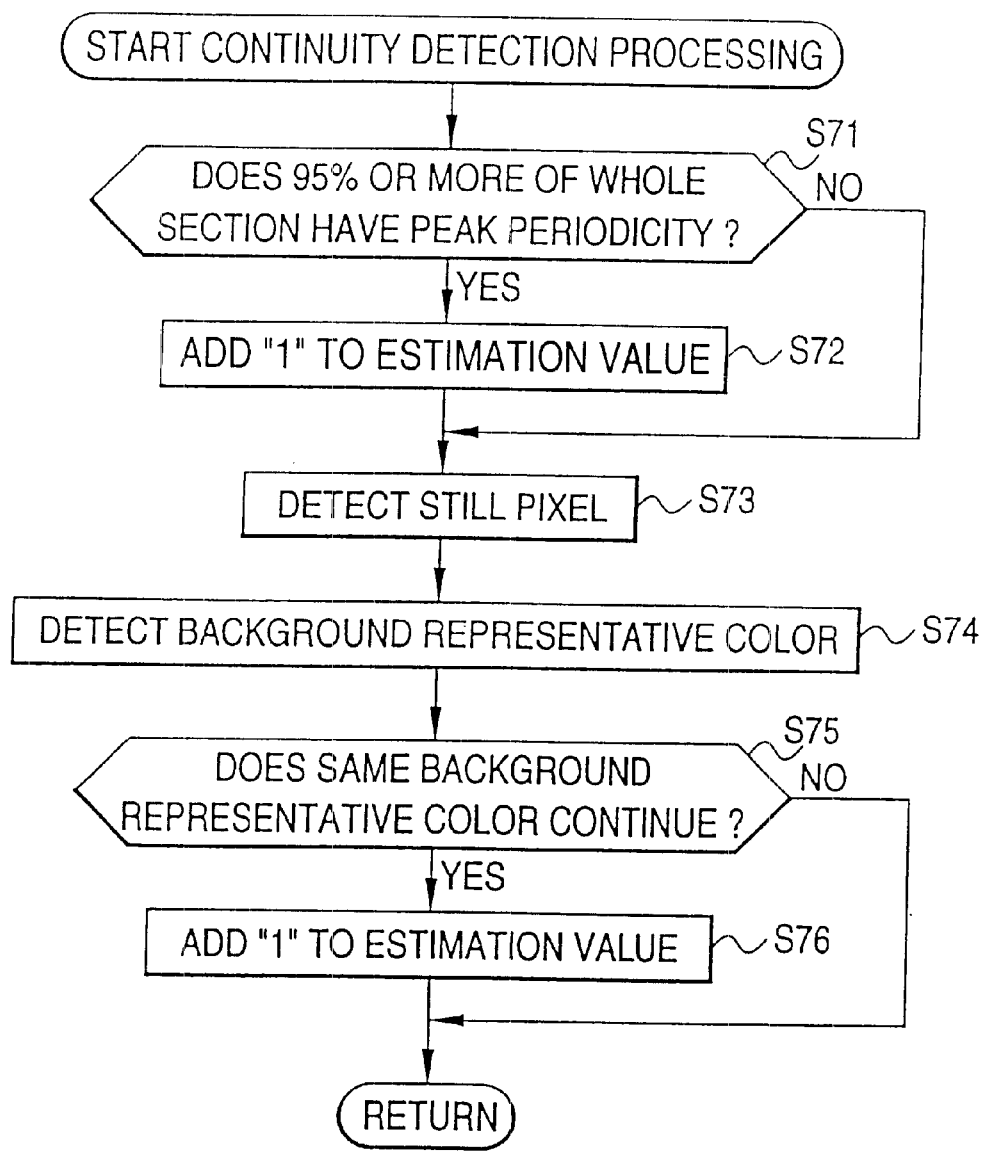
FIG. 23 is a flowchart showing an embodiment of the continuity detection processing of step S44 of FIG. 20.

Returning to step S44 of FIG. 20, commercial characteristic quantity detector 31 detects the continuity of the audio signal and the video signal of the commercial candidate section in step S44. The continuity detection processing will be described with reference to the flowchart of FIG. 23.

In step S71, commercial characteristic quantity detector 31 judges whether the periodicity of the peaks of the audio signal continues for a time which is equal to 95% or more of the commercial candidate section. The measurement of the continuity time of the periodicity of the peaks is performed by using the information obtained in step S43. If it is judged that the periodicity of the peaks of the audio signal continues for a time which is equal to 95% or more of the commercial candidate section, the processing goes to step S72.

In step S72, commercial characteristic quantity detector 31 adds "1" to the commercial characteristic value.

If it is judged in step S71 that the periodicity of the peaks of the audio signal does not continue for a time which is equal to 95% or more of the commercial candidate section, no addition is carried out on the commercial characteristic value and step S72 is skipped.

In step S73, commercial characteristic quantity detector 31 calculates the difference between the pixel values of corresponding pixels of two successive images and detects pixels whose differential values are below a predetermined threshold value, that is, pixels having no motion between the two images. In step S74, commercial characteristic quantity detector 31 generates a histogram of the pixel values of the pixels detected in step S73, and detects the pixel value indicating the maximum value as a representative color of the background. The processing of steps S73 and S74 is repetitively carried out in the commercial candidate section at a predetermined interval.

In step S75, commercial characteristic quantity detector 31 refers to plural representative colors of the background detected in step S74, and judges whether the same pixel value is continuously detected as the representative color of the background. If it is judged that the same pixel value is continuously detected as the representative color of the background, the processing goes to step S76.

In step S76, commercial characteristic quantity detector 31 adds "1" to the commercial characteristic value.

If it is judged in step S75 that the same pixel value is not continuously detected as the representative color of the background, no addition is carried out on the commercial characteristic value and step S76 is skipped.

Returning to step S45 of FIG. 20, the commercial characteristic quantity detector 31 detects the repetition of the image in step S45. The repetition detection processing is based on the observation that the same images are often repeated in commercials. For example, a ketchup commercial of 15 seconds might include a green forest scene (3 seconds), a blue sky scene (2 seconds), a green forest scene (2 seconds), a red ketchup scene (3 seconds), a green forest scene (2 seconds) and a red ketchup scene (3 seconds).

Figure 24:
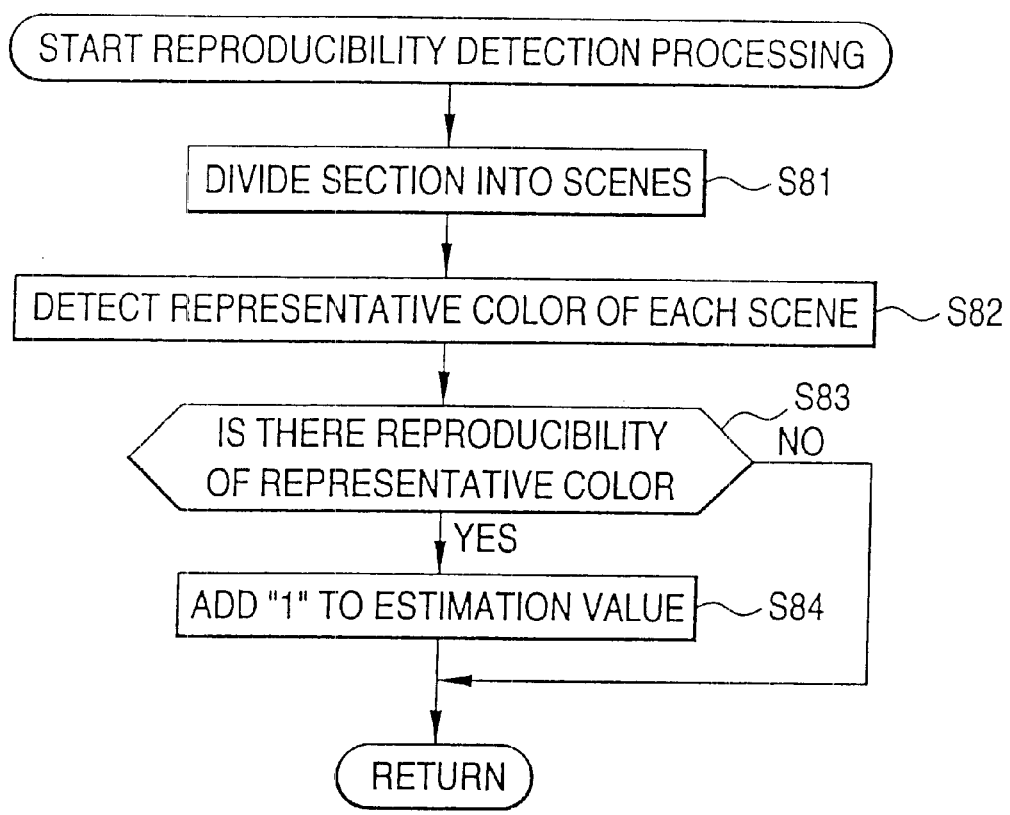
FIG. 24 is a flowchart showing an embodiment of the repetition detection processing of step S45 of FIG. 20.

The repetition detection processing of this image will be described with reference to the flowchart of FIG. 24.

In step S81, commercial characteristic quantity detector 31 segments the commercial candidate section at scene change points. In step S82, commercial characteristic quantity detector 31 generates a histogram of the pixel values of each scene segmented in step S81 with 16 gradations, and detects the pixel value indicating the maximum value as a representative color of the scene.

In step S83, commercial characteristic quantity detector 31 judges whether the representative color of the scene is repeated (the same representative color is detected in different scenes) in the commercial candidate section. If it is judged that the representative color of the scene is repeated, the processing goes to step S84.

In step S84, commercial characteristic quantity detector 31 adds "1" to the commercial characteristic value.

If it is judged in step S83 that the representative color of the scene is not repeated, no addition is carried out on the commercial characteristic value, and thus step S84 is skipped.

Figure 26:
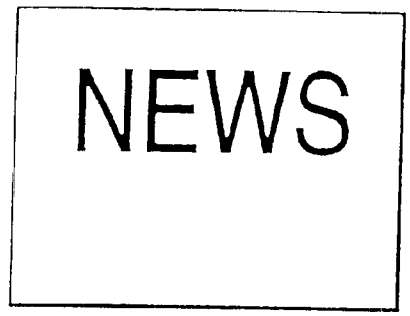
FIGS. 26(A) and 26(C) is a diagram showing an embodiment of the processing of one character of a telop.
Figure 26:
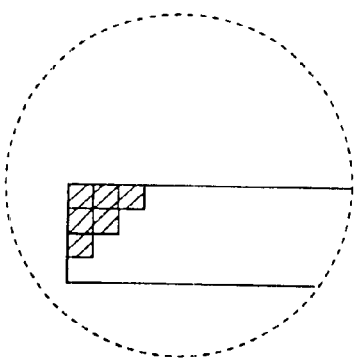
Figure 26:
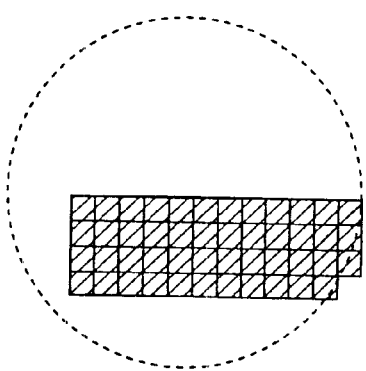

Returning to the step S46 of FIG. 20, commercial characteristic quantity detector 31 detects a "telop" (which could be a logo, a graphic, a mark, a slogan, or the like), as shown in FIG. 26A. The telop detection processing is based on the general observation that a telop is often displayed at or near the end time of a commercial. However, this routine could search for a telop at any part of a commercial candidate section.

Figure 25:
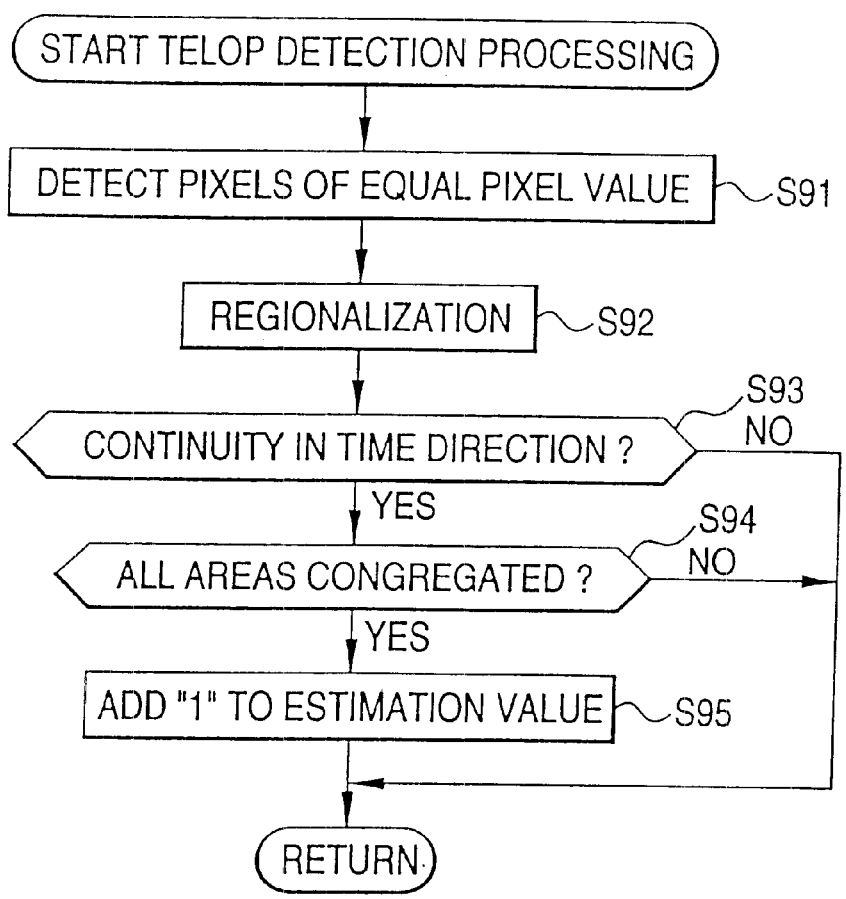
FIG. 25 is a flowchart showing an embodiment of the steps of telop detection processing of step S46 of FIG. 20.

The telop detection processing will be described with reference to the flowchart of FIG. 25. In step S91, commercial characteristic quantity detector 31 detects pixels which have the same pixel value and are adjacent to other pixels whose number is larger than a predetermined number in each frame image of a predetermined time (for example, 5 seconds) from the end of a commercial candidate section, as shown in FIG. 26(B).

In step S92, commercial characteristic quantity detector 31 searches and regionalizes pixels having the same pixel value as the pixels detected in step S91, as shown in FIG. 26(C).

In step S93, commercial characteristic quantity detector 31 judges whether the area obtained in step S92 is continuous in time (i.e., if the same area exists in the prior frame and in the next frame). If it is judged that the area is continuous in time, the processing goes to step S94.

In step S94, commercial characteristic quantity detector 31 detects the centroid of all the areas on an image, and calculates the average value of the distance between the centroid and each point on the areas. Commercial characteristic quantity detector 31 further compares the average value thus calculated with a predetermined threshold value to judge whether the areas are dense not. If it is judged that the areas are dense, the processing goes to step S95.

In step S95, commercial characteristic quantity detector 31 adds "1" to the commercial characteristic value.

If it is judged in step S93 that the areas are not continuous in time, no addition is carried out on the commercial characteristic value, and thus step S95 is skipped.

Returning to step S47 of FIG. 20, by using the same method as the telop detection processing as described above, commercial characteristic quantity detector 31 judges whether characters exist on an image for a time longer than a predetermined time from the start to the end of the commercial candidate section. If it is judged that characters exist on the image for a time longer than the predetermined time, "1" is added to the commercial characteristic value. Conversely, if it is judged that the characters do not exist on the image for a time longer than the predetermined time, no addition is carried out to the commercial characteristic value. This processing is based on a general observation that characters are often displayed in commercials.

Figure 27:
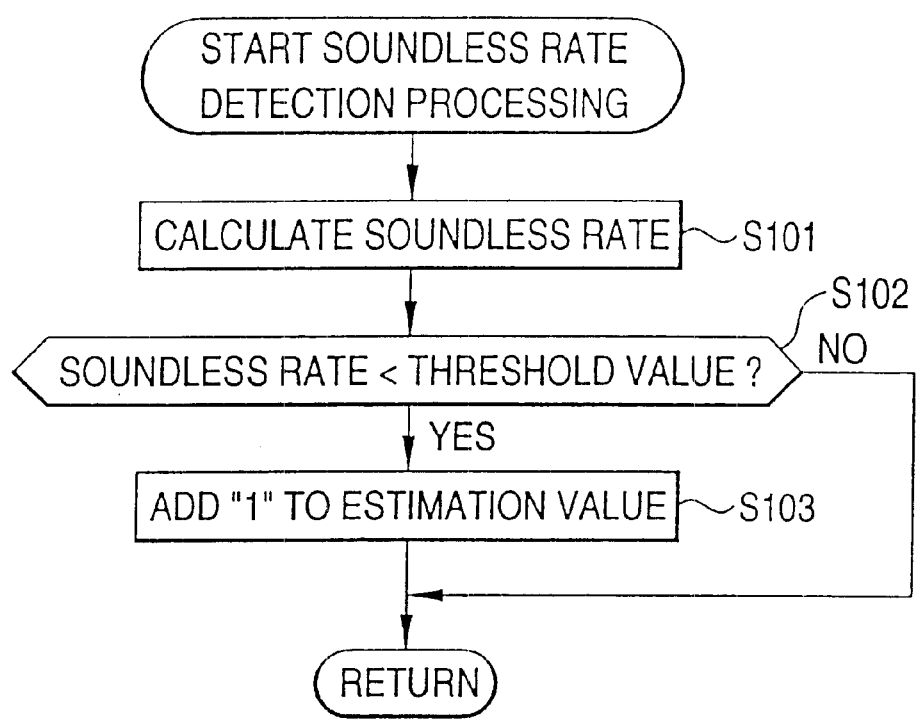
FIG. 27 is a flowchart showing an embodiment of the quietness rate detection processing of step S48 of FIG. 20.

In step S48, commercial characteristic quantity detector 31 detects the rate of a quiet section other than the start and end points of the commercial candidate section. The quietness rate detection processing is based on the general observation that quiet sections are rare in commercials. The quietness rate detection will be described with reference to the flowchart of FIG. 27.

Figure 28:
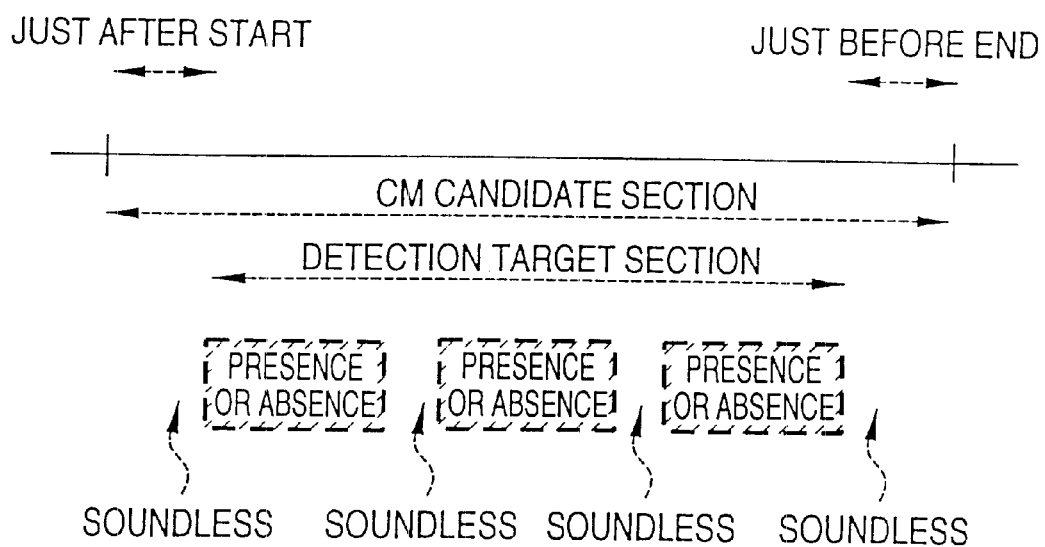
FIG. 28 is a diagram showing an embodiment of quietness rate detection processing.

In step S101, commercial characteristic quantity detector 31 reads out the information (e.g., the information shown in FIG. 11) stored in the memory of the commercial candidate section detector 16, and detects the frame number of the quiet section other than the start and end points of the commercial candidate section, as shown in FIG. 28. Further, commercial characteristic quantity detector 31 divides the frame number of the quiet section thus detected by the number of all the frames constituting the commercial candidate section to calculate the quietness rate.

In step S102, commercial characteristic quantity detector 31 judges whether the quietness rate calculated in step S101 is smaller than a predetermined threshold value. If it is judged that the quietness rate is smaller than the predetermined threshold value, the processing goes to step S103.

In step S103, commercial characteristic quantity detector 31 adds "1" to the commercial characteristic value.

If it is judged in step S102 that the quietness rate is not smaller than the predetermined threshold value, no addition is carried out to the commercial characteristic value, and thus step S103 is skipped.

Returning to step S49 of FIG. 20, commercial characteristic quantity detector 31 judges whether the commercial characteristic value is larger than a predetermined threshold value or not. If it is judged that the commercial characteristic value is larger than the predetermined threshold value, the processing goes to step S50. In step S50, commercial characteristic quantity detector 31 judges the commercial candidate section to be a commercial section.

If it is judged in step S49 that the commercial characteristic is value is not larger than the predetermined threshold value, the processing goes to step S51. In step S51, commercial characteristic quantity detector 31 judges the commercial candidate section not to be a commercial section.

In connection with this judgment result, commercial characteristic quantity detector 31 outputs "1" as a control signal to switch 6 in a commercial section, and outputs "0" as a control signal to switch 6 out of the commercial section.

As described above, in a video recorder (FIG. 1) of this embodiment, only a program of a television broadcast is recorded on magnetic tape 8, and no commercial is recorded on magnetic tape 8. Accordingly, when magnetic tape 8 is reproduced, only the program is displayed.

Figure 29:
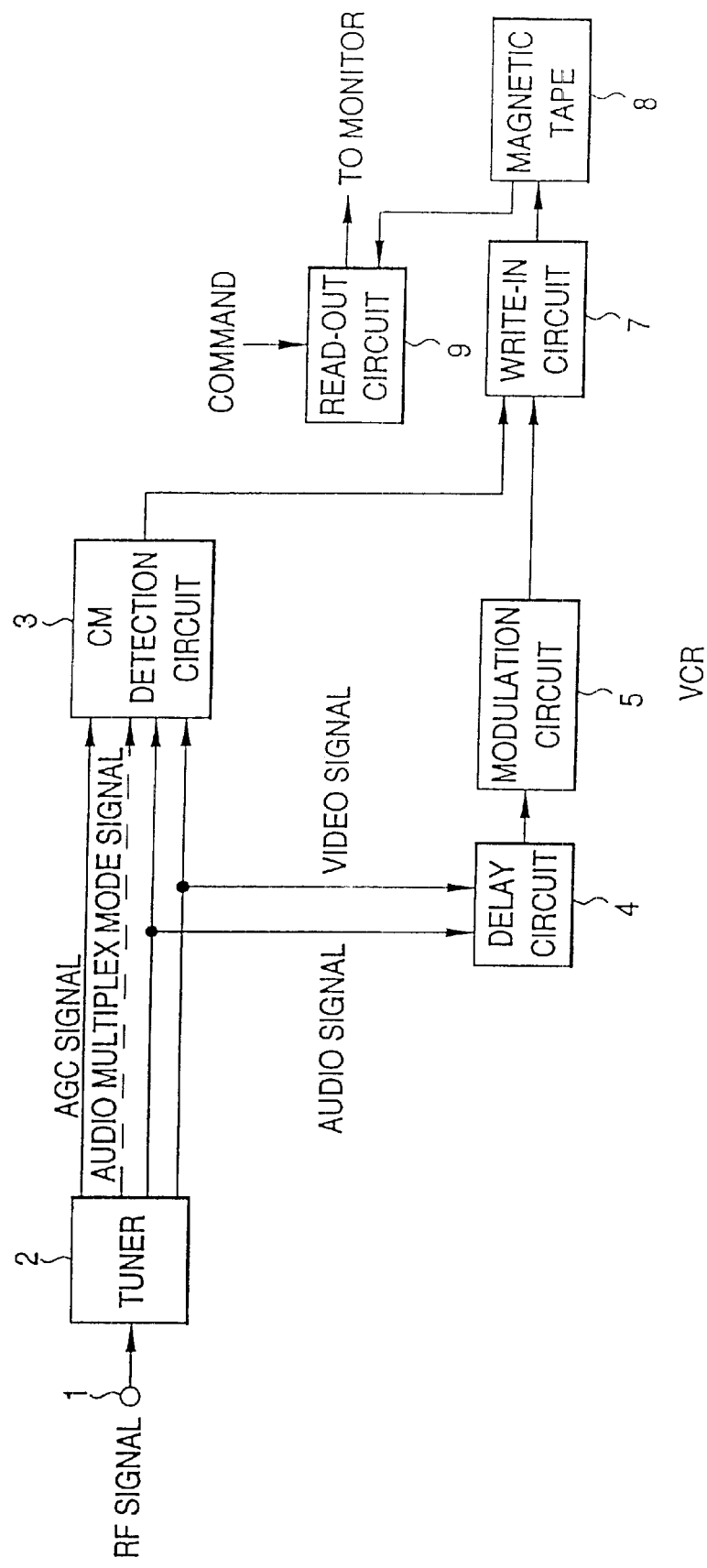
FIG. 29 is a block diagram showing a second embodiment of a video recorder to which the present invention is applied.

Some users want to record commercials, although these users typically fast-forward or skip the commercials when the recording is played. Therefore, a second embodiment of a video recorder which satisfies these needs, and to which the present invention is applied, will be described with reference to FIG. 29. This embodiment is obtained by removing switch 6 from the construction shown in FIG. 1 and supplying the commercial detection result of commercial detection circuit 3 to write-in circuit 7.

In the recording system of the second embodiment, write-in circuit 7 records all the video and audio signals (programs and commercials) of a television broadcast input from modulation circuit 5 on magnetic tape 8, and records information about the commercials (the time positions of the commercials, etc.) at predetermined positions on magnetic tape 8 on the basis of information from commercial detection circuit 3.

In the reproduction system, when a command for reproducing only the program (a command for removing commercials) is input from a user, read-out circuit 9 removes (fast-forwards or the like) the commercials on the basis of the information regarding the commercials recorded at predetermined positions of magnetic tape 8, demodulates only the program and supplies it to a monitor (not shown).

The present invention is not limited to a video recorder; it may be applied to a television receiver, a tuner, etc.

A computer program to perform the processing described above can be supplied to users not only via a recording medium such as a magnetic disc, CD-ROM or the like, but also a network supply medium such as Internet, a digital satellite or the like.

As described above, according to the information processing device, the information processing method and the supply medium of the present invention, a commercial candidate section is detected, the characteristics of commercials are detected in the commercial candidate section, a predetermined value is added to a commercial quantity value in accordance with the detection result, and it is judged on the basis of the commercial quantity value whether the commercial candidate section is a commercial or the like. Therefore, commercials contained in a television broadcast can be reliably detected.

Although only certain embodiments have been described in detail, those having ordinary skill in the art will certainly understand that many modifications are possible without departing from the teachings thereof. All such modifications are intended to be encompassed within the following claims.

We claim:

1. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the commercial candidate section includes scene changes; and the determining means includes a means for determining a frequency of the scene changes in the commercial candidate section.

2. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the determining means includes a periodicity detecting means for detecting whether an audio signal in the commercial candidate section has a periodicity, and a periodicity calculation means for calculating the periodicity detected by the periodicity detecting means.

3. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the commercial candidate section includes an audio signal with a periodicity, and the determining means includes a means for determining a degree of continuity of the periodicity of the audio signal.

4. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the commercial candidate section includes a video signal with a repetition, and the determining means includes a means for determining the repetition of the video signal in the commercial candidate section.

5. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the determining means includes a means for determining whether a telop exists in a video signal of the commercial candidate section.

6. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the determining means includes a means for determining whether a character exists in a video signal of the commercial candidate section.

7. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the determining means includes a means for determining a quietness rate in the commercial candidate section.

8. An apparatus for processing a television signal, the television signal including programs and commercials, the apparatus comprising:

a receiving means for receiving the television signal;

a detecting means for detecting a commercial candidate section in the television signal;

a determining means for determining a characteristic of the commercial candidate section; and a judgement means for judging whether the commercial candidate section is a commercial, based on the characteristic detected by the determining means, wherein the television signal includes quiet frames, and the detecting means includes a means for detecting quiet frames of the television signal disposed between a program and the commercial candidate section.

9. An apparatus for processing a television signal, the television signal including programs, commercials and scene changes, the apparatus comprising:

a receiving means for receiving a television signal;

a commercial candidate section detecting means for detecting a commercial candidate section in the television signal;

a frequency determining means for determining a frequency of scene changes in the commercial candidate section and for increasing a commercial characteristic value if the frequency of scene changes is above a predetermined level;

a periodicity determining means for determining whether an audio signal in the commercial candidate section has a periodicity, for calculating a level of periodicity detected, and for increasing a commercial characteristic value if the calculated periodicity is above a predetermined level;

a continuity determining means for determining a level of continuity of the periodicity of the audio signal in the commercial candidate section and for increasing a commercial characteristic value if the continuity is above a predetermined level;

a repetition determining means for determining a level of repetition of a video signal in the commercial candidate section and for increasing a commercial characteristic value if the repetition is above a predetermined level;

a telop detecting means for detecting a telop in the video signal of the commercial candidate section and for increasing a commercial characteristic value if a telop is detected;

a character detecting means for detecting a character in the video signal of the commercial candidate section and for increasing a commercial characteristic value if a character is detected;

a quietness rate determining means for determining a quietness rate of the commercial candidate section and for increasing a commercial characteristic value if the quietness rate is below a predetermined level; and a judgement means for judging whether the commercial candidate section is a commercial, based on the commercial characteristic value resulting from the operations of the frequency determining means, the periodicity determining means, the continuity determining means, the repetition determining means, the telop determining means, the character determining means, and the quietness rate determining means.

10. An apparatus for processing a television signal, the television signal including programs and commercials, the apparatus comprising:

a receiver configured to receive the television signal;

a first detector configured to detect a commercial candidate section in the television signal;

a second detector configured to detect a characteristic of the commercial candidate section; and a judgment circuit configured to judge whether the commercial candidate section is a commercial, based on the characteristic detected by the second detector, wherein the commercial candidate section includes scene changes, and the second detector detects a frequency of the scene changes in the commercial candidate section.

11. An apparatus for processing a television signal, the television signal including programs and commercials, the apparatus comprising:

a receiver configured to receive the television signal;

a first detector configured to detect a commercial candidate section in the television signal;

a second detector configured to detect a characteristic of the commercial candidate section; and a judgment circuit configured to judge whether the commercial candidate section is a commercial, based on the characteristic detected by the second detector, wherein the commercial candidate section includes an audio signal having a periodicity; and the second detector detects the periodicity of the audio signal in the commercial candidate section.

12. An apparatus for processing a television signal, the television signal including programs and commercials, the apparatus comprising:

a receiver configured to receive the television signal;

a first detector configured to detect a commercial candidate section in the television signal;

a second detector configured to detect a characteristic of the commercial candidate section; and a judgment circuit configured to judge whether the commercial candidate section is a commercial, based on the characteristic detected by the second detector, wherein the commercial candidate section includes an audio signal having a periodicity; and the second detector detects a continuity of the periodicity of the audio signal in the commercial candidate section.

13. An apparatus for processing a television signal, the television signal including programs and commercials, the apparatus comprising:

a receiver configured to receive the television signal;

a first detector configured to detect a commercial candidate section in the television signal;

a second detector configured to detect a characteristic of the commercial candidate section; and a judgment circuit configured to judge whether the commercial candidate section is a commercial, based on the characteristic detected by the second detector, wherein the commercial candidate section includes a video signal with repetition; and the second detector detects repetition of the video signal in the commercial candidate section.

14. An apparatus for processing a television signal, the television signal including programs and commercials, the apparatus comprising:

a receiver configured to receive the television signal;

a first detector configured to detect a commercial candidate section in the television signal;

a second detector configured to detect a characteristic of the commercial candidate section; and a judgment circuit configured to judge whether the commercial candidate section is a commercial, based on the characteristic detected by the second detector, wherein the second detector determines whether a telop exists in a video signal of the commercial candidate section.

15. An apparatus for processing a television signal, the television signal including programs and commercials, the apparatus comprising:

a receiver configured to receive the television signal;

a first detector configured to detect a commercial candidate section in the television signal;

a second detector configured to detect a characteristic of the commercial candidate section; and a judgment circuit configured to judge whether the commercial candidate section is a commercial, based on the characteristic detected by the second detector, wherein the second detector determines whether a character exists in a video signal of the commercial candidate section.

16. An apparatus for processing a television signal, the television signal including programs and commercials, the apparatus comprising:
a receiver configured to receive the television signal;
a first detector configured to detect a commercial candidate section in the television signal;
a second detector configured to detect a characteristic of the commercial candidate section; and
a judgment circuit configured to judge whether the commercial candidate section is a commercial, based on the characteristic detected by the second detector, wherein the second detector detects a quietness rate of the commercial candidate section.

17. An apparatus for processing a television signal, the television signal including programs and commercials, the apparatus comprising:
a receiver configured to receive the television signal;
a first detector configured to detect a commercial candidate section in the television signal;
a second detector configured to detect a characteristic of the commercial candidate section; and
a judgment circuit configured to judge whether the commercial candidate section is a commercial, based on the characteristic detected by the second detector, wherein the television signal includes quiet frames; and
the first detector detects quiet frames of the television signal disposed between a program and a commercial candidate section.

18. An apparatus for processing a television signal, the television signal including programs, commercials and scene changes, the apparatus comprising:
a receiver configured to receive the television signal;
a commercial candidate section detecting circuit configured to detect a commercial candidate section in the television signal;
a commercial characteristic value counter configured to store a previous commercial characteristic value, receive a commercial characteristic value signal and add a commercial characteristic value from the commercial characteristic value signal to the previous commercial characteristic value;
a frequency determining circuit configured to determine a frequency of scene changes in the commercial candidate section and send a commercial characteristic value signal to the commercial characteristic value counter if the frequency of scene changes is above a predetermined level;
a periodicity determining circuit configured to detect whether an audio signal in the commercial candidate section has a periodicity, calculate a level of periodicity detected, and send a commercial characteristic value signal to the commercial characteristic value counter if the calculated periodicity is above a predetermined level;
a continuity determining circuit configured to determine a level of continuity of the periodicity of an audio signal in the commercial candidate section and send a commercial characteristic value signal to the commercial characteristic value counter if the continuity is above a predetermined level;
a repetition determining circuit configured to determine a level of repetition of the video signal in the commercial candidate section and send a commercial characteristic value signal to the commercial characteristic value counter if the repetition is above a predetermined level;
a telop detecting circuit configured to detect a telop in the video signal of the commercial candidate section and send a commercial characteristic value signal to the commercial characteristic value counter if a telop exists;
a character detecting circuit configured to detect a character in the video signal of the commercial candidate section and send a commercial characteristic value signal to the commercial characteristic value counter if a character is detected;
a quietness rate determining circuit configured to determine a quietness rate of the commercial candidate section and send a commercial characteristic value signal to the commercial characteristic value counter if the quietness rate is below a predetermined level; and
a judgement circuit configured to judge whether the commercial candidate section is a commercial, based on the commercial characteristic value in the commercial characteristic value counter.

19. An apparatus for processing a television signal, wherein the television signal comprises an audio portion, the apparatus comprising:
a receiver for receiving the television signal;
a quiet threshold value determining circuit for determining a quiet threshold value from the television signal;
a comparitor for making a comparison of the audio portion of the television signal and the quiet threshold value; and
a judging circuit for judging whether or not a portion of the television signal is a commercial candidate section according to the comparison.

20. A method for processing a television signal, the television signal including programs and commercials, comprising the steps of:
receiving the television signal;
detecting a commercial candidate section in the television signal;
determining a characteristic of the commercial candidate section; and
judging whether the commercial candidate section is a commercial, based on the characteristic determined in the determining step, wherein
the commercial candidate section includes scene changes; and
the determining step includes determining a frequency of the scene changes in the commercial candidate section.

21. A method for processing a television signal, the television signal including programs and commercials, comprising the steps of:
receiving the television signal;
detecting a commercial candidate section in the television signal;
determining a characteristic of the commercial candidate section; and
judging whether the commercial candidate section is a commercial, based on the characteristic determined in the determining step, wherein
the determining step includes
determining whether an audio signal in the commercial candidate section has a periodicity; and
calculating the periodicity.

22. A method for processing a television signal, the television signal including programs and commercials, comprising the steps of:
- receiving the television signal;
- detecting a commercial candidate section in the television signal;
- determining a characteristic of the commercial candidate section; and
- judging whether the commercial candidate section is a commercial, based on the characteristic determined in the determining step, wherein
  - the commercial candidate section includes an audio signal having a periodicity; and
  - the determining step includes determining a continuity of the periodicity.

23. A method for processing a television signal, the television signal including programs and commercials, comprising the steps of:
- receiving the television signal;
- detecting a commercial candidate section in the television signal;
- determining a characteristic of the commercial candidate section; and
- judging whether the commercial candidate section is a commercial, based on the characteristic determined in the determining step, wherein
  - the commercial candidate section includes a video signal which has repetition; and
  - the determining step includes determining an amount of repetition of the video signal in the commercial candidate section.

24. A method for processing a television signal, the television signal including programs and commercials, comprising the steps of:
- receiving the television signal;
- detecting a commercial candidate section in the television signal;
- determining a characteristic of the commercial candidate section; and
- judging whether the commercial candidate section is a commercial, based on the characteristic determined in the determining step, wherein
  - the determining step includes determining whether a telop exists in a video signal of the commercial candidate section.

25. A method for processing a television signal, the television signal including programs and commercials, comprising the steps of:
- receiving the television signal;
- detecting a commercial candidate section in the television signal;
- determining a characteristic of the commercial candidate section; and
- judging whether the commercial candidate section is a commercial, based on the characteristic determined in the determining step, wherein
  - the determining step includes determining whether a character exists in a video signal of the commercial candidate section.

26. A method for processing a television signal, the television signal including programs and commercials, comprising the steps of:
- receiving the television signal;
- detecting a commercial candidate section in the television signal;
- determining a characteristic of the commercial candidate section; and
- judging whether the commercial candidate section is a commercial, based on the characteristic determined in the determining step, wherein
  - the determining step includes determining a quietness rate of the commercial candidate section.

27. A method for processing a television signal, the television signal including programs and commercials, comprising the steps of:
- receiving the television signal;
- detecting a commercial candidate section in the television signal;
- determining a characteristic of the commercial candidate section; and
- judging whether the commercial candidate section is a commercial, based on the characteristic determined in the determining step, wherein
  - the television signal includes quiet frames and
  - the detecting step includes detecting quiet frames of the television signal disposed between a program and a commercial candidate section.

28. A method for processing a television signal, the television signal including programs, commercials, and scene changes, comprising the steps of:
- receiving the television signal;
- detecting a commercial candidate section in the television signal;
- determining a frequency of scene changes in the commercial candidate section and increasing a commercial characteristic value if the frequency of scene changes is above a predetermined level;
- determining a periodicity of an audio signal in the commercial candidate section and increasing a commercial characteristic value if the periodicity is above a predetermined level;
- determining a continuity of a periodicity of the audio signal in the commercial candidate section and increasing a commercial characteristic value if the continuity is above a predetermined level;
- detecting a repetition of a video signal in the commercial candidate section and increasing a commercial characteristic value if the repetition is above a predetermined level;
- searching for a telop in the video signal of the commercial candidate section and increasing a commercial characteristic value if a telop is detected;
- searching for a character in the video signal of the commercial candidate section and increasing a commercial characteristic value if a characters is detected;
- determining a quietness rate of the commercial candidate section and increasing a commercial characteristic value if the quietness rate is below a predetermined level; and
- judging whether the commercial candidate section is a commercial, based on the commercial characteristic value after the preceding steps are performed.

29. A computer readable medium encoded with processor readable instructions that when executed by the processor implement a process to detect a commercial in a television program, the process comprising the steps of:
- receiving the television signal;
- detecting a commercial candidate section in the television signal;

determining a characteristic of the commercial candidate section; and judging whether the commercial candidate section is a commercial, based on the characteristic determined in the determining step, wherein the commercial candidate section includes scene changes; and the determining step includes determining a frequency of the scene changes in the commercial candidate section.

30. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the commercial candidate section includes an audio signal having a periodicity; and the determining step includes determining the periodicity of the audio signal in the commercial candidate section.

31. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the commercial candidate section includes an audio signal having a periodicity; and the determining step includes determining a level of continuity of the periodicity of the audio signal in the commercial candidate section.

32. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the commercial candidate section includes a video signal which has repetition; and the determining step includes determining a level of repetition of the video signal in the commercial candidate section.

33. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the determining step includes determining whether a telop exists in the video signal of the commercial candidate section.

34. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the determining step includes determining whether a character exists in the video signal of the commercial candidate section.

35. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the determining step includes determining a quietness rate of the commercial candidate section.

36. A computer readable medium encoded with processor readable instructions that when executed by the processor implement a process to detect a commercial in a television program, the process comprising the steps of:

receiving the television signal;

detecting a commercial candidate section in the television signal;

determining a characteristic of the commercial candidate section; and judging whether the commercial candidate section is a commercial, based on the characteristic determined in the determining step, wherein the television signal comprises quiet frames; and the detecting step includes detecting quiet frames of the television signal between a program and a commercial candidate section.

37. A computer readable medium encoded with processor readable instructions that when executed by the processor implement a process to detect a commercial in a television program, the process comprising the steps of:

receiving the television signal;

detecting a commercial candidate section in the television signal;

determining a frequency of scene changes in the commercial candidate section and increasing a commercial characteristic value if the frequency of scene changes is above a predetermined level;

determining a periodicity of an audio signal in the commercial candidate section and increasing a commercial characteristic value if the periodicity is above a predetermined level;

determining a continuity of a periodicity of the audio signal in the commercial candidate section and increasing a commercial characteristic value if the continuity is above a predetermined level;

detecting a repetition of a video signal in the commercial candidate section and increasing a commercial characteristic value if the repetition is above a predetermined level;

searching for a telop in the video signal of the commercial candidate section and increasing a commercial characteristic value if a telop is detected;

searching for a character in the video signal of the commercial candidate section and increasing a commercial characteristic value if a characters is detected;

determining a quietness rate of the commercial candidate section and increasing a commercial characteristic value if the quietness rate is below a predetermined level; and judging whether the commercial candidate section is a commercial, based on the commercial characteristic value after the preceding steps are performed.

38. An information processing apparatus for detecting commercial messages contained in a television broadcast, comprising:

a soundless section detector operable to detect a soundless section of the television broadcast;

a scene change detector operable to detect a scene change of the television broadcast;

a commercial candidate section detector operable to detect a commercial candidate section in accordance with a detection result of said soundless section detector and said scene change detector; and a commercial characteristic detector operable to detect a plurality of commercial characteristics in the commercial candidate section, wherein the commercial characteristic detector is further operable to obtain an estimation value in accordance with at least one of the plurality of commercial characteristics so as to judge whether the commercial candidate section is a commercial message based on the estimation value.

39. The information processing apparatus as claimed in claim 38, wherein said commercial characteristic detector detects a frequency of the scene change.

40. The information processing apparatus as claimed in claim 38, wherein said commercial characteristic detector detects a periodicity of an audio signal.

41. The information processing apparatus as claimed in claim 38, wherein said commercial characteristic detector detects a continuity of an audio signal and a video signal.

42. The information processing apparatus as claimed in claim 38, wherein said commercial characteristic detector detects a reproducibility of a video signal.

43. The information processing apparatus as claimed in claim 38, wherein said commercial characteristic detector detects characters on a picture.

44. The information processing apparatus as claimed in claim 38, wherein said commercial characteristic detector detects a soundless rate of an audio signal.

45. A method for detecting commercial messages contained in a television broadcast, comprising the steps of:

detecting a soundless section of the television broadcast;

detecting a scene change of the television broadcast;

detecting a commercial candidate section in accordance with a detection result of the detecting a soundless section step and the detecting a scene change step; and detecting a plurality of commercial characteristics in the commercial candidate section, wherein the detecting a plurality of commercial characteristics step includes obtaining an estimation value in accordance with at least one of the plurality of commercial characteristics, and judging whether the commercial candidate section is a commercial message based on the estimation value.

46. The method of claim 45, wherein the detecting a plurality of commercial characteristics step comprises detecting a frequency of the scene change.

47. The method of claim 45, wherein the detecting a plurality of commercial characteristics step comprises detecting a periodicity of an audio signal.

48. The method of claim 45, wherein the detecting a plurality of commercial characteristics step comprises detecting a continuity of an audio signal and a video signal.

49. The method of claim 45, wherein the detecting a plurality of commercial characteristics step comprises detecting a reproducibility of a video signal.

50. The method of claim 45, wherein the detecting a plurality of commercial characteristics step comprises detecting characters on a picture.

51. The method of claim 45, wherein the detecting a plurality of commercial characteristics step comprises detecting a soundless rate of an audio signal.

52. A computer readable medium encoded with processor readable instructions that when executed by the processor implement a process to detect commercial messages contained in a television broadcast, the process comprising the steps of:

detecting a soundless section of the television broadcast;

detecting a scene change of the television broadcast;

detecting a commercial candidate section in accordance with a detection result of the detecting a soundless section step and the detecting a scene change step; and detecting a plurality of commercial characteristics in the commercial candidate section, wherein the detecting a plurality of commercial characteristics step includes obtaining an estimation value in accordance with at least one of the plurality of commercial characteristics, and judging whether the commercial candidate section is a commercial message based on the estimation value.

53. The computer implemented process of claim 52, wherein the detecting a plurality of commercial characteristics step comprises detecting a frequency of the scene change.

54. The computer implemented process of claim 51, wherein the detecting a plurality of commercial characteristics step comprises detecting a periodicity of an audio signal.

55. The computer implemented process of claim 51, wherein the detecting a plurality of commercial characteristics step comprises detecting a continuity of an audio signal and a video signal.

56. The computer implemented process of claim 51, wherein the detecting a plurality of commercial characteristics step comprises detecting a reproducibility of a video signal.

57. The computer implemented process of claim 51, wherein the detecting a plurality of commercial characteristics step comprises detecting characters on a picture.

58. The computer implemented process of claim 51, wherein the detecting a plurality of commercial characteristics step comprises detecting a soundless rate of an audio signal.

* * * * *

UNITED STATES PATENT AND TRADEMARK OFFICE
CERTIFICATE OF CORRECTION

PATENT NO. : 6,459,735 B1
DATED : October 1, 2002
INVENTOR(S) : Taro Suito et al.

It is certified that error appears in the above-identified patent and that said Letters Patent is hereby corrected as shown below:

<u>Title page,</u>
Item [57], ABSTRACT,
Line 7, please change "an" to -- a --.

<u>Column 1,</u>
Line 8, please change "09/448,037" to -- 09/448,837 --.

<u>Column 4,</u>
Line 66, please change "characters" to -- character --.

<u>Column 5,</u>
Line 47, please change "characters" to -- character --.

<u>Column 6,</u>
Line 11, change "5(A) and 5(C)" to -- 5(A) through 5(C) --;
Line 27, change "FIGS. 12(A) and 12(C)" to -- FIGS. 12(A) through 12(C) --;
Line 33, change "14(A) and 14(G)" to -- 14(A) through 14(G) --;
Line 36, change "15(A) and 15(C)" to -- 15(A) through 15(C) --;
Line 41, change "17(A) and 17(E)" to -- 17(A) through 17(E) --;
Line 45, change "18(A) and 18(E)" to -- 18(A) through 18(E) --;
Line 66, change "26(A) and 26(C)" to -- 26(A) through 26(C) --;

<u>Column 17,</u>
Line 22, please change "dense not" to -- dense or not --.

<u>Column 18,</u>
Line 11, change "characteristic is value" to -- characteristic value --.

<u>Column 24,</u>
Lines 23-25, please delete in its entirety;
Line 36, change "20." to -- 19. --;
Line 52, change "21." to -- 20. --.

<u>Column 25,</u>
Line 1, change "22." to -- 21. --;
Line 16, change "23." to -- 22. --;
Line 32, change "24." to -- 23. --;
Line 46, change "25." to -- 24. --;
Line 60, change "26." to -- 25. --.

UNITED STATES PATENT AND TRADEMARK OFFICE
CERTIFICATE OF CORRECTION

PATENT NO. : 6,459,735 B1
DATED : October 1, 2002
INVENTOR(S) : Taro Suito et al.

It is certified that error appears in the above-identified patent and that said Letters Patent is hereby corrected as shown below:

Column 26,
Line 8, change "27." to -- 26. --;
Line 23, change "28." to -- 27. --;
Line 52, change "characters" to -- character --;
Line 60, change "29." to -- 28 --.

Column 27,
Line 11, change "30." to -- 29. --;
Line 28, change "31." to -- 30. --;
Line 45, change "32." to -- 31. --;
Line 62, change "33." to -- 32. --.

Column 28,
Line 9, change "34." to -- 33. --;
Line 24, change "35." to -- 34. --;
Line 38, change "36." to -- 35. --;
Line 54, change "37." to -- 36. --.

Column 29,
Line 14, change "characters" to -- character --;
Line 22, change "38." to -- 37. --;
Line 42, change "39." to -- 38. --;
Lines 43 and 46, change "claim 38" to -- claim 37 --;
Line 45, change "40." to -- 39. --;
Line 48, change "41." to -- 40. --;
Lines 49 and 52, change "claim 38" to -- claim 37 --;
Line 51, change "42" to -- 41. --;
Line 54, change "43." to -- 42. --;
Lines 55 and 58, change "claim 38" to -- claim 37 --;
Line 57, change "44." to -- 43. --;
Line 60, change "45." to -- 44. --.

UNITED STATES PATENT AND TRADEMARK OFFICE
CERTIFICATE OF CORRECTION

PATENT NO.     : 6,459,735 B1
DATED          : October 1, 2002
INVENTOR(S)    : Taro Suito et al.

It is certified that error appears in the above-identified patent and that said Letters Patent is hereby corrected as shown below:

Column 30,
Line 7, change "46." to -- 45. --; same line, change "claim 45" to -- claim 44 --;
Line 10, change "47." to -- 46. --; same line, change "claim 45" to -- claim 44 --;
Line 13, change "48." to -- 47. --; same line, change "claim 45" to -- claim 44 --;
Line 16, change "49." to -- 48. --; same line, change "claim 45" to -- claim 44 --;
Line 19, change "50." to -- 49. --; same line, change "claim 45" to -- claim 44 --;
Line 22, change "51." to -- 50. --; same line, change "claim 45" to -- claim 44 --;
Line 25, change "52." to -- 51. --;
Line 43, change "53." to -- 52. --; same line, change "claim 52" to -- claim 51 --;
Line 47, change "54." to -- 53. --;
Line 51, change "55." to -- 54. --;
Line 55, change "56." to -- 55. --.
Line 59, change "57." to -- 56. --;
Line 62, change "58." to -- 57. --.

Signed and Sealed this

Twenty-third Day of September, 2003

JAMES E. ROGAN
*Director of the United States Patent and Trademark Office*